US011914987B2

(12) United States Patent
Acharya et al.

(10) Patent No.: US 11,914,987 B2
(45) Date of Patent: Feb. 27, 2024

(54) MASTER UPDATE AGENT AND DISTRIBUTED UPDATE AGENT ARCHITECTURE FOR VEHICLES

(71) Applicant: Excelfore Corporation, Fremont, CA (US)

(72) Inventors: Shrikant Acharya, Fremont, CA (US); John Crosbie, Fremont, CA (US); Pawel Veselov, Saratoga, CA (US)

(73) Assignee: Excelfore Corporation, Fremont, CA (US)

( * ) Notice: Subject to any disclaimer, the term of this patent is extended or adjusted under 35 U.S.C. 154(b) by 98 days.

(21) Appl. No.: 17/781,923

(22) PCT Filed: Dec. 2, 2020

(86) PCT No.: PCT/US2020/062813
§ 371 (c)(1),
(2) Date: Jun. 2, 2022

(87) PCT Pub. No.: WO2021/113305
PCT Pub. Date: Jun. 10, 2021

(65) Prior Publication Data
US 2023/0025735 A1 Jan. 26, 2023

Related U.S. Application Data

(60) Provisional application No. 62/942,739, filed on Dec. 2, 2019.

(51) Int. Cl.
*G06F 8/65* (2018.01)
*G06F 11/14* (2006.01)
(Continued)

(52) U.S. Cl.
CPC ............ *G06F 8/65* (2013.01); *G06F 11/1433* (2013.01); *H04L 67/12* (2013.01); *H04L 67/34* (2013.01); *G06F 2201/865* (2013.01)

(58) Field of Classification Search
USPC .................................................. 717/168–173
See application file for complete search history.

(56) References Cited

U.S. PATENT DOCUMENTS

2005/0132351 A1\* 6/2005 Randall ............... G06F 11/1433
717/168
2008/0238678 A1 10/2008 De Castro et al.
(Continued)

OTHER PUBLICATIONS

PCT International Search Report and Written Opinion of International Searching Authority dated Mar. 11, 2021, corresponding to PCT International Application No. PCT/US 2020/062813 filed Dec. 2, 2020.

*Primary Examiner* — Qing Chen
(74) *Attorney, Agent, or Firm* — Lempia Summerfield Katz LLC

(57) ABSTRACT

A system and method for an eSync update agent is provided. The update agent can communicate with an eSync client, which receives software updates from an external server and transmits the software updates to the update agent. In turn, the update agent may use its programming to determine one or more aspects of the software update, such as when or whether to perform the software update on its associated electronic device and whether to rollback the update in response to a failure performing the software update on its associated electronic device. The update agent may also be tasked with performing one or both of data gathering from or device control of its associated electronic device. The various functions, including software updating, data gathering and device control, may be programmable and activatable, thereby tailoring the functions performed by the update agent to the lifecycle needs of its associated electronic device.

24 Claims, 11 Drawing Sheets

(51) Int. Cl.
*H04L 67/12* (2022.01)
*H04L 67/00* (2022.01)

(56) References Cited

U.S. PATENT DOCUMENTS

| | | | |
|---|---|---|---|
| 2013/0227543 A1* | 8/2013 | Chen | G06F 8/654 |
| | | | 717/172 |
| 2015/0169311 A1* | 6/2015 | Dickerson | G06F 8/65 |
| | | | 717/170 |
| 2019/0050294 A1* | 2/2019 | Ferzli | H04L 67/34 |
| 2019/0155650 A1 | 5/2019 | Teshler et al. | |
| 2019/0268420 A1 | 8/2019 | Acharya et al. | |
| 2019/0286433 A1 | 9/2019 | Sawada | |

* cited by examiner

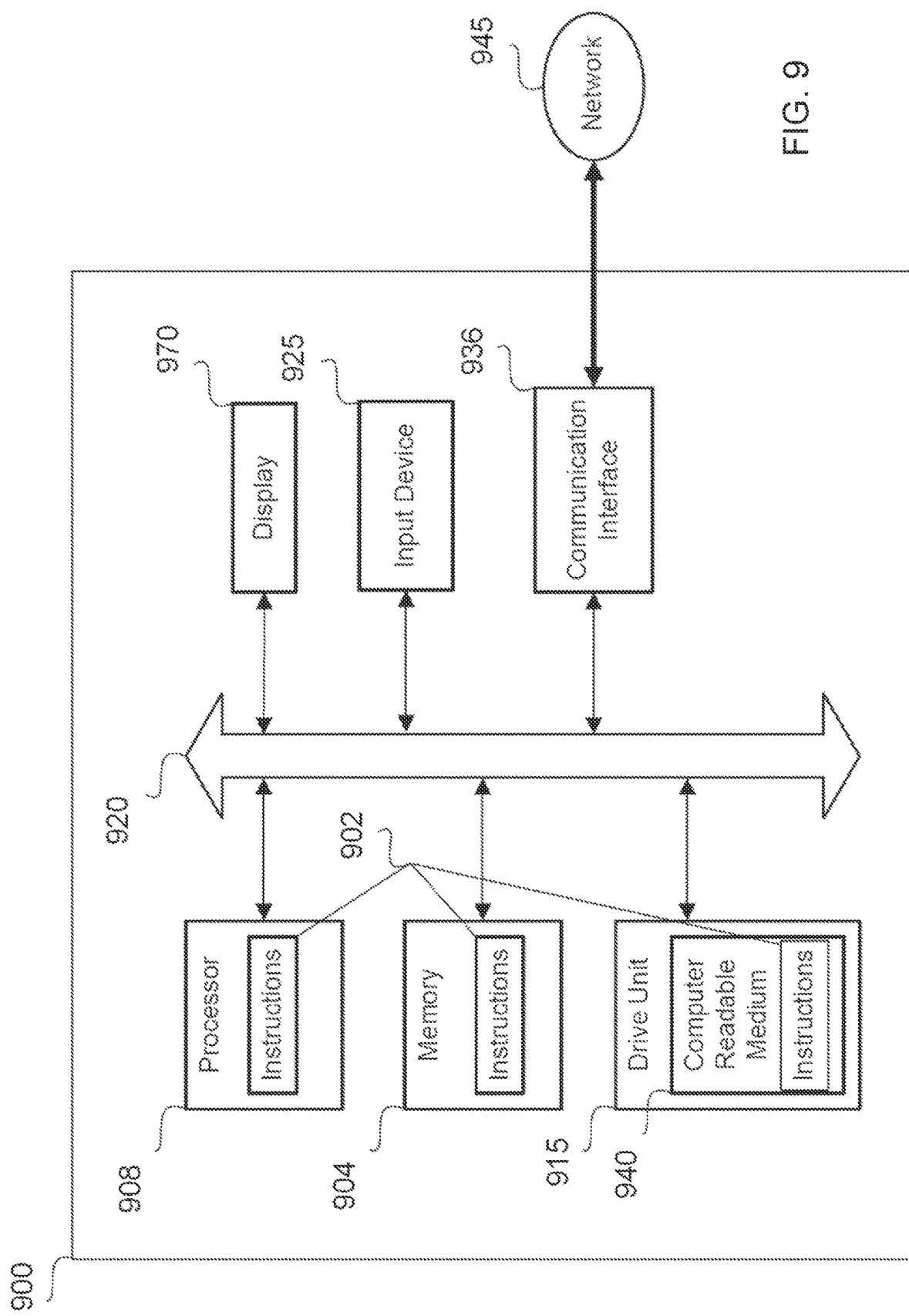

MASTER UPDATE AGENT AND DISTRIBUTED UPDATE AGENT ARCHITECTURE FOR VEHICLES

REFERENCE TO RELATED APPLICATION

This application is the US National Stage of International Application No. PCT/US2020/062813, filed Dec. 2, 2020, which claims the benefit of U.S. Provisional Application No. 62/942,739 filed on Dec. 2, 2019, the entirety of both of which are incorporated by reference herein.

BACKGROUND

Vehicles today include electronics to control and manage the vehicle. The electronics may be in various forms, such as microprocessors, microcontrollers, or the like. The electronics execute software therein in order to provide the functionality desired (e.g., in order to manage and control the operation of the vehicle). The software resident in the vehicle may be subject to software updates. These software updates may be periodically installed in the vehicle (e.g., in the electronics) for various purposes, such as to correct or resolve software errors, upgrade the software to prevent hacking, or the like.

BRIEF DESCRIPTION OF THE DRAWINGS

FIG. 9 illustrates a block diagram of an exemplary computer architecture.

DETAILED DESCRIPTION

Figure 1:
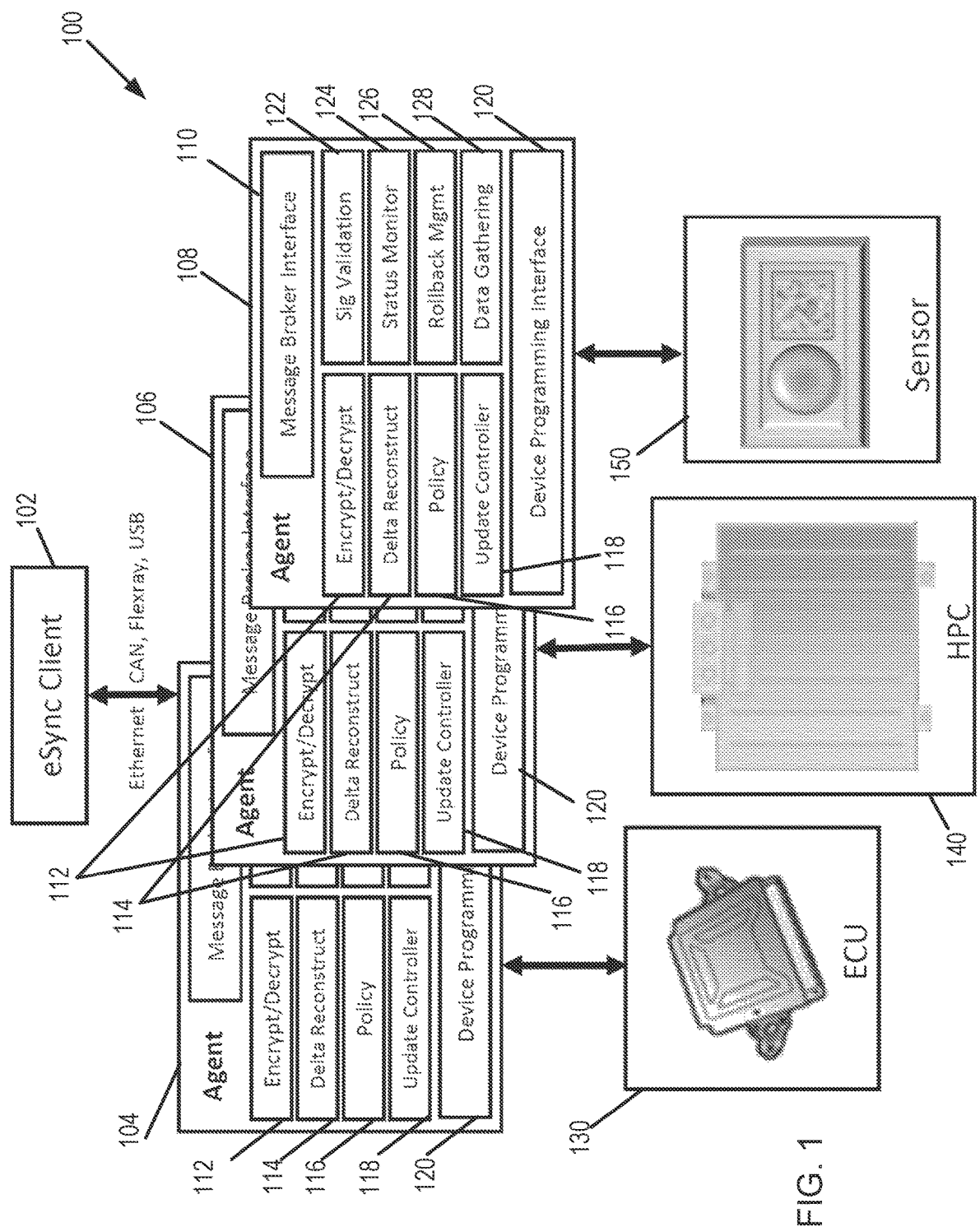
FIG. 1 illustrates a block diagram showing an example of eSync Agents in the Vehicle.

Electronic devices may be present in a variety of contexts, such as vehicles, buildings, passenger ships, trains, automated mass transit systems, or any other type of large constituent system. As one example, software may be present in one or more electronic devices resident in a vehicle. As another example, software may be present in a plurality of electronic devices within a building or other type of dwelling or residence. In particular, buildings may necessitate extensive monitoring, with electronics described herein to manage various operations in the buildings, including their energy consumption, emergency evacuation, etc. The building may have multiple zones (such as multiple floors) with each zone have one or more electronic devices assigned or associated with the respective zone. In the multi-floor building example, a building with 30 floors may have an electronic device (or a set of electronic devices) assigned or associated with each respective floor in order to control communication, heating/air conditioning, fire safety, and the like. As still another example, electronic devices may be used in passenger ships, trains, or automated mass transit systems. Thus, to the extent any disclosure herein is directed to a vehicle, the disclosure may be equally applied to any other electronic environment. Further, in one or some embodiments, a device in an eSync platform may be defined as a system that runs a single eSync Client (e.g., in one or some embodiments, one vehicle may have one eSync Client, discussed below, so that the vehicle may be called a device; alternatively, one vehicle may have more than one eSync Client, such as illustrated in U.S. Pat. No. 10,834,206, incorporated by reference herein in its entirety).

The electronic devices within an environment such as a vehicle may be subject to a software update or multiple software updates. To that end, in one or some embodiments, an update agent (herein also called an agent, an eSync agent, an agent device, or an eSync agent device) may be designed to be associated with an electronic device resident in the vehicle. Various associations of the update agent are contemplated. As one example, the update agent may be incorporated inside and resident within the electronic device resident in the vehicle (or other environment). As another example, the update agent may be resident in a node separate from the node assigned to the electronic device (e.g., as discussed further below, for electronic devices, such as ECUs with limited processing and/or memory capability to perform decryption, the update agent may be resident at a closest node to the node or endpoint assigned to the electronic device. Thus, placement of the update agent in the electronic architecture of the vehicle may be flexible (e.g., the update agent may be a module at the most logical place to control the associated electronic device). In addition, the update agent allows for scaling depending on the number of electronic devices in the vehicle. For example, a single eSync client may be assigned to a vehicle, or multiple eSync clients may be assigned to a vehicle (such as a first eSync client for the essential domain and a second eSync client for the non-essential domain). In turn, the number of update agents assigned to the respective eSync client may be dependent on the number of electronic endpoints within the respective eSync client's domain.

Various electronic devices are contemplated, including any one, any combination, or all of: ECUs; sensors; high performance computers (HPC); virtual machines (or other virtualizations); etc. In practice, one, some, or each electronic device subject to software updates may be assigned an update agent. The eSync client may communicate with a server (such as a software update server) external to the vehicle in order to download or obtain the software updates. In turn, the eSync client may transmit or communicate the software updates to the update agents for the update agents to perform the actual software updates of the electronic devices (e.g., the update agents include the intelligence to determine whether and/or when to perform the software updates on the electronic devices, which may be an example of software update condition indications). This division of responsibilities between the eSync client and the update agents enables more intelligence at the edge (e.g., the update agents are more intelligence allowing a more decentralized intelligence in the vehicle electronic ecosystem). As discussed further below, the eSync client may be tasked with communicating with the external server in order to perform certain functions, such as any one, any combination, or all of: receiving software update downloads from the external server and routing the software updates to the responsible update agents; reporting results of the success/failures of the software updates received from the update agents to the external server; receiving programming commands from the external server, such as a programming indication in order to program the update agents to activate performing at least one of a software updating (e.g., one or more software update condition indications), data gathering (e.g., one or more data gathering condition indications), or device controlling (e.g., one or more control parameters), and routing the programming commands to the responsible update agents; etc. The update agent may be tasked with communicating with the eSync agent on one side and with the associated electronic devices on the other side in order to perform any one, any combination, or all of software updating, data gathering or device controlling. In this way, the update agent may provide a standardized interface for updates. As discussed in more detail below, the responsibility of the agent may also extend to gathering system information (data gathering) (e.g., any one, any combination, or all of the following within the vehicle: state of charge; speed of the vehicle; ignition on or off state; and deliver such status to the eSync system, with an example of an eSync system disclosed in U.S. Pat. No. 10,834,206, incorporated by reference herein in its entirety).

Thus, in one or some embodiments, the update agent may incorporate intelligence to perform one or more functions, which may be programmable (such as programmable in terms of activation to perform the one or more functions (e.g., whether to perform the one or more functions) and/or programmable in terms of the criteria to perform the one or more functions (e.g., how to perform the one or more functions)). As merely one example, the update agent may perform any one, any combination, or all of: (1) performing software updates; (2) data gathering (e.g., communicating with the associated electronic device to obtain data from sensors resident or associated with the electronic device; intelligent data gathering to determine whether to data gather and/or to determine whether to transmit the gathered data back to the eSync client (e.g., the update agent may analyze the similarity and/or dissimilarity of the data gathered with data previously transmitted to determine whether to transmit the data back to the eSync client; in one embodiment, responsive to the update agent determining similarity of the data gathered with data previously transmitted results in one or both of deciding not to transmit the data gathered to the eSync client and/or discarding the data gathered; alternatively, responsive to the update agent determining dissimilarity of the data gathered with data previously transmitted results in deciding to transmit the data gathered to the eSync client); or (3) control of the endpoint device (e.g., programmatic rules, which may be an example of a control parameters and may be downloaded by the eSync client from an external server and routed to the update agent for storage, may be used to control the electronic device associated with the update agent; in this way, the update agent may provide command control to the electronic device associated with the update agent). Thus, because the update agent includes intelligence to perform the various functions, the update agent need not rely on one or both of the external server or the eSync client to perform the various functions if communication is temporarily lost.

Further, in one or some embodiments, the functions performed by the update agent may be programmably activated. In particular, the eSync client may communicate with the external server in order to receive the programming indication, which may indicate whether to activate a respective update agent to perform one, some, or each of the various functions described herein (e.g., any one, any combination, or all of software updating, data gathering, or device control). In this way, the activation of functions in the update agent may be sequential, such as activation of performing functions at least two or more of the software updating, the data gathering, or device controlling or such as activation of performing the functions of each of the software updating, the data gathering, or device controlling. This programmable activation may thus provide flexibility in one of several ways, including depending on the needs of the endpoint (e.g., the electronic device associated with the update agent may not need to perform a function immediately after manufacture, but may need to perform the function, such as a safety function, after a certain period of time, such as dependent on future regulations or the like) and/or depending on the wishes of the external server (e.g., the external server may provide a data gathering service, which may be provided as a service), thereby enabling better lifecycle management of the endpoint electronic devices In this way, the functions described may be deactivated (or subject to limited activation) upon manufacture of the vehicle, and later be activated (e.g., progress from performing no functions to performing some functions; progress from performing one function to performing more than one function; progress from performing some functions to performing all possible functions). In particular, with regard to an ECU, flexibility is provided to incorporate the functionality presently needed for the ECU, and thereafter updating the functionality, via the update agents, as the needs of the ECU change.

Further, the update agents provide a manifestation of intelligence at the endpoint. As one example, with regard to software updates, the update agents may include the intelligence whether and/or when to perform the software updates and/or whether and/or when to perform software rollbacks. In particular, the eSync client may transmit the software updates to the update agents. In turn, the update agents, with programming that may be included in the update agents upon manufacture or later transmitted from the eSync client, may determine whether to perform the update (e.g., the conditions that the respective update agent determines allows for performing the software update and/or the conditions that the respective update determines disallows or delays performing the software update, which are examples of the software update condition indications). Thus, even if a respective update agent receives a software update from the eSync client, thereby indicating to the respective update agent that the software update is for immediate updating of the software in the electronic device associated with the update agent, the update agent may determine to delay (or optionally discard) the software update. The update agent may consider one or more criteria in making its determination whether to perform the update, including one or both of: one or more aspects of the vehicle (e.g., at least one aspect of the current operation of the vehicle, such as current speed); or one or more aspects of the software in the electronic device associated with the update agent (e.g., a time stamp as to the last time when the software was updated and/or a time stamp associated with the initial programming of the electronic device upon manufacture). For example, the update agent may determine whether to perform the software update based on the current operation of the vehicle (such as whether the vehicle is travelling greater than 50 mph or some other non-zero predetermined speed; if the update agent determines that the vehicle is travelling greater than 50 mph, the update agent may determine to delay performing the software update; if the update agent determines that the vehicle is travelling less than 50 mph, the update agent may determine to perform the software update). In this way, the software update may access data associated with the current operation of the vehicle (such as data that may be resident or available in the ECU associated with the update agent or data that the update agent may request from an ECU that is not associated with the update agent) in order to perform its determination. As another example, the update agent may determine whether to perform the software update based on at least one aspect of the software subject to the update (such as whether the software has been updated, manufactured, or installed within a predetermined time period; if so, the update agent may determine to delay performing the software update or may determine to discard the software update). In this way, the software agent may resolve policies (e.g. user opt-in and/or user rescheduling) in determining whether and/or when to perform the software update.

Alternatively, or in addition, the update agent, such as a master update agent discussed below, may determine whether and/or how to perform a software rollback. For example, the update agent may have stored therein one or more rollback indications, such as one or more criteria to determine whether to perform the software rollback responsive to the update agent detecting a failure in the software update (such as a failure in updating the software of the device associated with the update agent and/or a failure in updating the software of the device that is not associated with the update agent). As discussed above, the one or more rollback indications may be stored in the update agent upon manufacture and/or may be dynamically updated, such as being included as a programming indication. The update agent may determine, based on the one or more rollback indications, whether to perform a rollback of software (in its associated electronic device and/or in the case of a master update agent by sending a command to one or more follower update agents to rollback the software in the one or more follower update agents' associated electronic devices), and responsive to the determination, perform the rollback of the software. The determination as to the rollback may be dependent on a rollback policy. For example, in the context of a master update agent, responsive to the master update agent device determining that there is the failure in the software update associated with one or both of the electronic device associated with the master update agent or the one or more electronic devices associated with the one or more follower update agents, the processor is configured, based on a policy resident in the master update agent, to determine whether to instruct the one or more follower update agent devices to rollback the software (e.g., the master update agent instructs all of the one or more follower update agents to rollback the software in order to perform a synchronized rollback of the software; the master update agent instructs only the one or more follower update agents to rollback the software in order to perform a synchronized rollback of the software if their associated electronic device has suffered a failure; the master update agent may determine a type or class of electronic device (such as essential versus non-essential, discussed below) subject to the failure in the software update and based on the determined type or class of electronic device subject to the failure in the software update, instruct one or more of the follower update agent devices to rollback the software (such as in the case of an essential electronic device failing the software update, rolling back all essential and non-essential devices controlled by the master update agent or in the case of a non-essential electronic device failing the software update, rolling back only the non-essential devices controlled by the master update agent). In this way, the rollback decisions may be pushed to and resident in the update agents (e.g., closer to or at the endpoint), as opposed to in the eSync client or in the backend server.

As discussed above, a master update agent may control one or more follower update agents (which in turn control their associated electronic devices). In one or some embodiments, the master update agent may be associated with an electronic device, thus directly controlling its associated electronic device in addition to indirectly controlling the associated electronic devices of the one or more follower update agents. Further, decisions, such as any one, any combination or all of software update decisions, rollback decisions, data gathering decisions, device control decisions, may be performed in the master update agent (and in turn the master update agent may command the one or more follower update agents to implement those decisions) or may be performed in the update agent (and in turn the update agent only implements the decisions in its associated electronic device and not in any non-associated electronic device). As one example, if several endpoint electronic devices are connected via a single gateway, with the gateway having a single port to manage a plurality of endpoint electronic devices, a single master update agent may ultimately control each of the endpoint electronic devices via the single port.

In addition, in one or some embodiments, a one-to-one architecture may assign an update agent to an endpoint electronic device in a one-to-one fashion. Alternatively, a one-to-many architecture may assign an update agent to a plurality of endpoint electronic devices in a one-to-many fashion.

Thus, a number of agents and/or various types of agents may be within the vehicle. In one or some embodiments, a master agent may hold one or more follower agents in a cluster to drive updates to controller area network (CAN)-based ECUs hanging on a single bus or multiple CAN buses for example, as discussed further below. In this regard, one, two, three, or more follower agents in the vehicle may be controlled by one master agent.

Agents (e.g., master and/or follower agents and interchangeably termed eSync Agents or eSync Agent devices) may perform one or more functions. As one example, agents may resolve policies (e.g., user opt-in or user rescheduling and/or specific device-related policies for the ECU). As one example, the device (such as the ECU or another electronic device in the vehicle) has been updated (such as at the mechanic) and has a time period for which the device should not be updated, which the devices may implement in conjunction with system agents. In particular, the device may have stored therein (such as via a tag or the like) an indication of the update protocol (e.g., whether a software update is allowed to be performed at all; whether a software update is allowed to be performed only after a certain time (such as only after a defined date); whether a software update is allowed to be performed only under certain circumstances (e.g., only when the vehicle is in a certain state, only when the device is in a certain state (such as idle), etc.). The agent may access the device in order to obtain the device-specific policies. Responsive to receiving the device-specific policies from the specific device subject to a potential update, the agent may make the determination whether to perform the update. For example, responsive to the agent accessing the device-specific policies from a specific device, with the device-specific policies indicating that updating is not to be performed until after a future date (such as 2 months from the present date), the agent may determine not to perform the update. Further, the agent may docket the future date in its memory in order to perform the update at the future date. Alternatively, or in addition, agents may gather diagnostics information. In this regard, the agent may perform any one, any combination, or all of the functions described herein.

As merely one example, updates may be performed in an eSync platform in the context of any one, any combination, or all of: eSync Agents; an eSync Bus; eSync Client(s); an eSync Cloud; eSync Element(s); eSync Monitor(s); eSync Server(s); or eSync Tree(s). As discussed further below, an eSync Agent may update ECUs using incoming/downloaded software. eSync Agents in the eSync platform may support two-way information transfer, and may perform updates and/or may gather data for diagnostics.

The eSync Bus may adhere to a protocol of communications among eSync Elements, which may be adjudicated by the Message Broker in eSync Client. The Message Broker (interchangeably termed the broker or broker device), disclosed in U.S. Pat. No. 10,834,206, may be a part of the eSync Client, which may be an integrated entity to securely route messages among eSync Elements. It may be a bus-oriented system, able to support multicast and broadcast messages as well as basic point-to-point messages.

The eSync Client may comprise some or all of the software functions that are typically implemented one time in the vehicle to control the eSync over the air (OTA) flow in the vehicle. The eSync Client may include any one, any combination, or all of the following: the Orchestrator (e.g., any one of the Download Manager, Authenticator, Controller); Message Server; HMI Service; Policy Service; Status Service; or Health Monitor Service. The eSync Client may receive updates, verify the update, and then transfer the updates to the correct eSync Agent within the vehicle it communicates to.

The eSync Cloud may host the eSync Server and may be resident on any cloud such as Amazon Web Services (AWS), Azure or an OEM's private cloud. eSync Elements may comprise an eSync Client and its subcomponents, in which single or multiple combined eSync Agent(s) may be termed eSync Elements. eSync monitor may comprise a part of the eSync Client, and may perform any one, any combination or all of: monitoring; recovering; or restarting eSync Client subcomponents (e.g., HMI Service, Policy Service, Orchestrator), and eSync Agents. eSync Server may be used for storing updates, deploying campaigns, displaying vehicle status, and/or communicating with devices on the field and report to the user. An eSync Tree may comprise the eSync Client's registry of its configuration, agent certificates, and persistent storage.

FIG. 1 illustrates a block diagram 100 showing an example of eSync Agents in the Vehicle (such as defined in the eSync Alliance Specifications v1.0). Examples of an eSync Agents are disclosed in U.S. Pat. No. 10,834,206, incorporated by reference herein in its entirety. In particular, FIG. 1 shows three ECUs with varying functionality presenting a standardized interface to the eSync Client. Fewer or greater numbers of ECUs are contemplated. Each system's proprietary interface may be hidden under the standardized (e.g., abstracted) interface that each device presents to the eSync Client during power up. The functionality presented includes one or both of the following functions: (1) updates (e.g., in the form of an Update Controller); and (2) data gathering.

Thus, ECUs may reside on different network segments or buses, within the same vehicle. As merely one example, any one, any combination, or all of the telematics unit, Powertrain, Infotainment, advanced driver-assistance systems (ADAS), and Chassis may host a wide array of ECUs connected to different network buses (e.g., one or both of the CAN and LIN buses). The OEM may maintain a software repository that hosts software updates produced both by the OEM and suppliers. An OEM may push software updates to all applicable vehicles, or a vehicle may pull the latest known software updates. Some gateway ECUs, or telematics and infotainment ECUs, have a wireless connection to the Internet. Updates may be disseminated to vehicles via this secure wireless connection, or through physical distribution channels, such as dealerships, customer-inserted USB sticks, or OBDII ports usually reserved for diagnostics.

In this regard, updating ECUs and electronic systems inside a vehicle manufactured by multiple suppliers and vendors may be a cumbersome task, and may take days to update all electronic hardware with newer software in a given car. The vehicle also may need to be driven to the service center for a software update. This costs several thousands of dollars to OEMs and Dealers and adds annoyance to vehicle owners. In one or some embodiments, the eSync platform may facilitate an OTA solution that follows "Server-Client-Agent" model, whereby multiple "agents" may reside on different systems inside the vehicle to perform the updates received by the client sent by the server, as discussed further below.

Various devices may be present in the vehicle, including any one, any combination, or all of ECUs 130, high performance computers (HPCs) 140, or sensor(s) 150. Any device, including whether it is an ECU 130/HPC 140/Sensor 150, has the option to either only have agents that provide updates to the ECU or have agents that provide updates to as well as Data Gathering functions from the ECU. Further, any discussion herein regarding an ECU may be equally applied to any other type of electronic device resident in the vehicle, such as HPCs or sensors.

The designer is thus provided with the flexibility to incorporate the functionality that the designer needs from the ECU, and these agents may be updated as needed to add additional information that may be needed from it. Thus, in practice, the agents, once written to the device with all the functionality, may be over-the-air (OTA) ready as they are designed.

Further, if a full-functionality agent is not desired or contemplated during initial roll-out, agents may be updated from an external server, such as an eSync Server, with a new revision of software or configuration.

The eSync agent may be tailored specifically to the characteristics of the specific ECU to which it is assigned and may provide one, some, or all of the following functions tailored to the specific ECU: authentication; enumeration; and other properties to identify itself to the eSync OTA Client. Referring back to FIG. 1, eSync Client 102 may communicate with one or more eSync Agents 104, 106, 108, such as via Ethernet, CAN bus, Flexray, USB, or the like. Further, eSync Agents 104, 106, 108 are shown as including various functionality, such as Message Broker Interface module 110, Encrypt/Decrypt module 112, Delta Reconstruct module 114, Policy module 116, Update Controller module 118, Signature Validation module 122, Status Monitor module 124, Rollback Management module 126, Data Gathering module 128, and Device Programming Interface module 120. The term module may comprise software, hardware, or a combination of software and hardware. Further, the delineation of modules as shown in FIG. 1 is merely for illustration purposes. Other divisions are contemplated. Further, various functionalities may be combined.

Message Broker Interface module 110 is configured to communicate with a Message Broker, an example of which is disclosed in U.S. Pat. No. 10,834,206, which is incorporated by reference herein in its entirety. As discussed above, in one or some embodiments, the Message Broker may reside in an eSync Client, such as eSync Client 102. In this regard, an eSync Client may communicate via the Message Broker to one or more eSync Agents, such as eSync Agents 104, 106, 108.

With Encrypt/Decrypt module 112, the functions of encryption and/or decryption may be performed the eSync Agent 104, 106, 108. In one or some embodiments, due to the end-to-end security concept in eSync Architecture, payload arriving till the endpoint device may be secured and be encrypted till the point where the flashing tool occurs. Specifically, depending on the ECU capability, an eSync Agent may decrypt an incoming payload. Typically, ECUs may be low power/low memory devices; hence, decryption may be considered optional but may become important depending on implementation options. Further, eSync Agents may gather data and send it to eSync Server via an eSync Client. In such cases, the data may be encrypted before transmission from the eSync Agent system. In this regard, an encryption process may be supported on eSync Agent.

Thus, the eSync Agent may decrypt an encrypted payload and/or reconstruct the payload for flashing the ECU with a new image. Alternatively, or in addition, the eSync Agent may encrypt any data collected from ECU hardware before sending to eSync Client. In general cases, the eSync Agent may not be able to run on the ECU but off of the ECU on a gateway or on a TBox (e.g., a device proximate to the ECU). In such cases, the eSync Agent residing at a location outside ECU, may decrypt the payload and transfer the decrypted payload. The eSync Agent may also perform encryption of data gathered from the ECU(s) before sending to eSync Client for further relaying it to eSync Server With Delta Reconstruct module 114, the functions of delta update as disclosed in U.S. Pat. No. 10,834,207, incorporated by reference herein in its entirety, may be performed the eSync Agent 104, 106, 108.

Policy module 116 may include information that defines the state or conditions under which the ECU may be flashed with an update. The eSync Agent 104, 106, 108 may make use of Policy module 116 to make sure the ECU is fit for an update and accordingly flashes the ECU with new software. In one or some embodiments, the policies may vary from ECU to ECU and from vendor to vendor. As merely one example, the policy may indicate the conditions under which the update is to be performed and/or the conditions under which the update should not be performed (e.g., update should not be performed if ECU board temperature is >100 deg C.; update should not be performed if the device associated with the eSync Agent has been updated at manufacture and has a time period for which it should not be updated). In this regard, the eSync Agents may resolve policies regarding updating the software (e.g. user opt-in or user rescheduling and, even specific device related policies for the ECU such as the device has been updated at manufacture and has a time period for which it should not be updated).

Update Controller module 118 may be configured to steer the verified updates or reconstructed updates to the Device Programming Interface to flash the final ECU memory.

Signature Validation module 122 may be configured to verify and/or validate an electronic signature, thereby ensuring that the incoming decrypted payload or delta reconstructed payload includes the correct signature before it is sent to the Device Programming Interface module 120.

Status Monitor module 124 may be configured to know the status of the device so that it may be reported to eSync Client and eSync Server. Various aspects of status are contemplated including any one, any combination, or all of: implement certain function calls via the device programming interface to know the status of flash progress or performance (e.g., ongoing, completed, and/or failed); read version number and propagate the information eSync Client for other services to consume (e.g., display on HMI); or incorporate memory integrity checks to know the health of memory, available memory, quarantined memory on ECU As discussed above, a software update may fail for a variety of reasons. As such, it is important to leave an ECU in the best or last known good state when a certain update fails. The Rollback Management module 126 is configured to provide required checks and functions to achieve rolling back of previous working version to an ECU. This may be done with careful evaluation; else, any rogue entity may initiate this rollback operation and cause havoc to the overall functioning of the ECU.

As such, the Rollback Management module 126 may perform any one, any combination, or all of: rolling the software to a previous version depending on the campaign update conditions; manage rollback of failed or incorrect updates flashed into ECUs; provide the necessary functions and interfaces to check if rollback is allowed and if yes to which version it should be rolled back to; or attempt to perform the rollback a predetermined number of times (e.g., in case of a failure to flash an update, the eSync Agent may examine a campaign flag (if present) the capability to rollback the software to a previous state, after a preset number of retries).

In one or some embodiments, the version rollback feature may be controlled by eSync Agent. In particular, in one or some embodiments, only the first version of any component may have a rollback value defined in its manifest xml that points to the EOL (factory version). Other than that, none of the future versions for any component may have the rollback field defined in their manifest xml. If an update of a component fails, it is expected that the eSync Agent may perform the rollback using a local copy of the "last known" version (e.g., a software version to restore the component back to its successful state0. Since this rollback version may not come from the manifest, the eSync Client may obtain this information from the update agent and report it back to the server.

When the eSync Client first communicates with the update agents (e.g., the querypackage message), it may ask for the installed versions and all the available version details from all the update agents. The update agents in reply may send the information about the installed version and the available version. The information shared by the update agents may include any one, any combination, or all of the following:
- name: Same as in the query.
- type: Same as in the query.
- Replyid: Same as in the query.
- version: Installed version. If no version installed, the value should be JSON null.
- Deltacap: Available delta capability which is used by the server to produce a delta binary.
- versionlist: list of all available versions for the package at that time and their information like.
- version: <binary file location>, <SHA256 value>, <downloaded: True/False>

The "downloaded" flag may imply whether the copy of the versioned binary is available locally for delta reconstruction and rollback purpose. The flag downloaded=True implies that the version is available locally and may be used for the delta reconstruction and the rollback purpose. If any version is listed as available (e.g., downloaded=True) but does not have the SHA256 value in the list, that version is not considered for Delta reconstruction.

This may provide the eSync Client with the information about the available versions. Also, the update agent module may mention the "Rollback order" for each of the available version, zero being the highest priority. In one or some embodiments, no two versions may have the same priority. Further, when the target version fails to install, the eSync Agent may check its local storage for the availability of the last known working version. The information about the last known working version may be provided by the eSync Client in "readyupdate" message (under "rollbackversions" property).

If the update agent finds the version, then it tries to install that version. If successful, the status is updated to eSync Client in an "updatestatus" message with target version and rollback version information.

Further, if the update agent module does not find the installed version binary locally, then it may send the status as "INSTALL_FAILED". In one or some embodiments, the eSync Client may never download the rollback version binary. If the "last known working version" is not available locally, the update agent module (which may be part of Update Controller module 118) may not report it as available. Rather, the query-package should have the flag downloaded=False.

In addition, if the update agent module finds the version but fails to install the version, then, if more versions are available, the update agent module may attempt to install them. The information about the other versions may be provided by eSync Client based on the query-package response from the update agent. If successful, then the update agent module may update the eSync Client with the status.

Finally, if the update agent module fails to install all of the available versions, then the update agent module may send the status as "INSTALL_FAILED" and set the flag "terminal-failure"=True, indicating to the eSync Client not to try to install the target version ever.

In one or some embodiments, when the update agent module reports the version installation as successful, then the eSync Client may send a "confirm-update" message requesting the update agent module to save the installed version as the "last known working version". Responsive to receiving this message, the update agent module may save the installed version and update the versions directory (if not reading the installed version from the device directly).

If the eSync Client reports a nonpersistent atomic package failure, the update agent module may be told to rollback to its previous version (even if the target version may have been successful). The update agent module may rollback to the previous version and update the status to the eSync Client. When the eSync Client sends "confirm-update" message, then the update agent module may save the installed version in its local storage as "last known working version".

For the nonpersistent atomic package failure and subsequent rollback, if any of the components in the package does not have any rollback version listed, then such components may stay at the current state (e.g., installed or failed). For the nonpersistent atomic package failure and subsequent rollback, if any other component fails (to rollback), then that component may report INSTALL_FAILED. Responsive thereto, the eSync Client may not request the components (in the package) to rollback further. In such a scenario, the SOTA UI may show success for the components which are successfully installed and failure for the components which are failed.

Thus, the update agent (such as the master update agent) may access an update policy (such as resident in Policy module 116), in order to determine whether/which to rollback the software in the electronic devices associated with the update agent(s) (e.g., whether to rollback the software of the electronic devices associated with the master update agent and/or associated follower update agents that are supervised by the master update agent). As one example, the update policy may indicate that a failure in one or some of the update processes in the electronic devices results in a global rollback for all electronic devices (e.g., a single failure results in all electronic devices reverting back to their previous versions and report the reversion to the cloud server). As another example, the update policy may indicate that a failure in one or some of the update processes results in rollback only in the failed devices (e.g., if the update policy indicates that rollback only occurs in failed electronic devices or dependent electronic devices, then the rollback is performed only on those electronic devices that have been marked as having failed). As one example, if there is a failure in updating the software for an essential ECU (e.g., an "essential" ECU may be defined as performing a certain function, such as a safety function, for the vehicle), but not a failure in updating the software for a non-essential ECU (e.g., a "non-essential" ECU may be defined as not performing a certain function, such as a safety function, for the vehicle), the master update agent may cause the rollback of all ECUs under its ultimate control (e.g., rollback of both non-essential ECUs and essential ECUs; in the instance of the master update agent being associated with the essential ECU and the update agents being associated with non-essential ECUs, the master update agent performs the rollback of the software for the essential ECU and instructs the follower update agents to perform the rollback of the software for the non-essential ECUs). Conversely, if there is a failure in updating the software for a non-essential ECU, but not a failure in updating the software for the essential ECU, the master update agent may instruct some or all of the update agents associated with the non-essential ECUs to perform the rollback (e.g., in one or some embodiments, the master update agent may instruct the rollback of the software for all non-essential ECUs responsive to determining a failure in the software update for one or more of the non-essential ECUs; alternatively, the master update agent may instruct the rollback of the software only for the non-essential ECUs that suffered a failure in the software update). In this way, the master update agent may determine, based on the policy that is resident or associated with the master update agent, whether to perform the rollback. In one particular instance, the policy may indicate that a failure of software update in one electronic device under the ultimate control of the master update agent commands the master update agent to rollback the software for all electronic devices under the ultimate control of the master update agent. In another particular instance, the policy may indicate that a failure of software update in one electronic device under the ultimate control of the master update agent commands the master update agent to: (1) determine a class or type of electronic device that was subject to failure (e.g., a non-essential ECU or an essential ECU); and (2) responsive to determining the class or type of electronic device that was subject to failure, determine which devices to rollback (e.g., responsive to determining that the failure was in an essential ECU, rollback all of the electronic devices under the ultimate control of the master update agent; responsive to determining that the failure was in a non-essential ECU, rollback some or all of the non-essential ECUs under the ultimate control of the master update agent). In this way, the master update agent may have the intelligence to perform the software update and/or the rollback without reliance on the eSync client.

As discussed above, there are a variety of reasons for failure in the software update including: transmission Failure; update Failures; failure during the update process; or functional nonperformance after update. While transmission failure may necessitate resumption of connection to the cloud, other failures may be managed by having a local cache in the vehicle depending on certain aspects, such as depending on the level of risk associated with an ECU failure. As merely one example, the following rollback strategy may be followed: for high-risk ECUs, 2 or 3 local versions of that ECU firmware is recommended; for low-risk ECUs, 1 local version is recommended; and for no-risk ECUs, no local version is needed (e.g., in this case, however, the previous rollback update may be procured from the cloud. This strategy may eliminate local cache flash-memory requirements).

Depending on the number of ECUs and the associated number of backups required, local in-vehicle additional flash-memory requirements (if any) need to be computed and allocated. In order to enable a fixed baseline (version 1.0), all deltas are calculated from that baseline for rollback.

With regard to an In-ECU rollback, if the ECU supports such a rollback, it may be possible to have new and old ECU firmware reside inside the ECU and simply do a swap back to the old one if the new one does not perform to specification. Each such ECU may have double memory requirements within it. This method provides the fastest method of rollback recovery.

With regard to an In-Vehicle rollback, if the vehicle architecture supports it, it may be possible to have off-ECU storage. This storage may be large enough to hold a copy of the last working version of all ECU updates, plus an additional buffer. The buffer is typically recommended to be 25-100% of the total of all updates.

With regard to insurance kernel, insurance kernel is a proprietary fail-safe strategy, wherein there is limited memory available on the system. This method, however, may be hardware specific, and may require access to boot-loader of each ECU, and therefore may be custom-developed.

With regard to a Dealer-Service scenario, although unlikely, it is possible that the ECU gets "bricked" during an update, and any of the rollback strategies outlined above are unable to recover it. In that case, the vehicle owner needs to be informed and the vehicle taken to the nearest service shop for a manual ECU update.

With regard to Data Gathering module 128, diagnostic information may comprise one or both of two types: (1) OTA-related; or (2) vehicle-related. OTA diagnostics may include success or fail data, the time required for updating the ECU and the number of retries. Vehicle diagnostics can include ECU health information, sensor data, and Diagnostic Trouble Codes. Periodically, it may be desirable to know the ECU status, health, and get diagnostic information and share with eSync Server via eSync Client. The Data Gathering module 128 in eSync may provide these functions and interfaces to extract data from ECU and push to the eSync server.

The Device Programming Interface module 120 may be configured to handle a plurality of functions for the eSync Agent. Merely by way of example, the device programming interface may perform any one, any combination or all of: access the flash tools if the tools are separate; flash the binary; or access the flash tools supplied by the vendor.

In particular, the Device Programming Interface module 120 may be configured to program the ECUs (e.g., via a CAN bus interface or serial port interface or USB interface or any other specific or generic interface) and may vary from ECU to ECU. Alternatively, or in addition, the Device Programming Interface module 120 may ensure that the flashed image is correct thru ECU vendor defined mechanisms and may vary from ECU to ECU. Finally, the eSync Agent may use the Device Programming Interface module 120 to program the updates onto ECU program memory. In this way, even if the manufacturers of the endpoint devices (such as ECU 130, HPC 140, or sensor 150) may not disclose all of the proprietary aspects of the endpoint devices, the standardized layer via the Device Programming Interface module 120 enables standardized software updating, data gathering, and/or device control.

The eSync Specification 1.0 may also provide a mechanism for placing the agent outside of the ECU in the nearest domain controller that has adequate resources, in the event the ECU does not have enough resources to house an agent. In particular, an ECU, which may not have sufficient processing and/or memory capability, may be unable to perform the functions of an agent. In that regard, the agent may then be situated in the nearest domain controller that has the resources to manage the ECU. Examples of such ECUs without adequate resource may include legacy devices and that have not traditionally managed their own updates. However, in the instance of certain CAN devices, they may have been provisioned with a UDS (Universal Diagnostic Services) Server to provide for updates. Further, the agent may reside in the domain controller and may also be applied to LIN (Local Interconnected network) devices. Thus, the architecture, and specifically the agents (and the functionality of the agents) may be applied to various applications, including adapting to legacy ECUs.

In particular, there are instances where the ECUs are less powerful, have low memory to work on and some of the properties of eSync Agent (such as Delta Reconstruction and/or Encryption/Decryption) may not be possible to run on the ECU. In such cases, the eSync Client may be modified to suit the limitations of such an ECU and update the ECU thru a different mechanism. Such ECUs may comprise a classic AUTOSAR-compliant ECUs, with Software Component, RTE and Basic Software running on some Hardware.

In such a situation, the eSync Client may perform any one, any combination, or all of: communicate with the eSync Server to determine whether new updates available for the ECU; communicate with an agent (termed a Special Agent) that translates the eSync Bus messages to CAN bus messages; receive the CAN message and proceed with writing to flash based on the flash construct or design. Further, the software component may make use of RTE and Basic Software to access flash for any one, any combination, or all of: flash read/write; SHA Verification; or Reset Bootloader.

The Special Agent may perform any one, any combination, or all the following functions: translate eSync Messages (e.g., Query Version, Download Ready, Update Ready) to CAN Messages as commands; participate in the eSync bus message to subscribe to the relevant agent messages (e.g., some of the messages may be required to transform the request to CAN message format and sent to the ECU); store the working copy of payload to the backup folder (e.g., this copy may be used as the reference copy for the server to create a delta package); reconstruct the next version from the delta package received to use in case of a failed upgrade to the ECU; transfer the payload to the flash of ECU and instructs to reconstruct the new application to the backup flash partition; instruct the ECU to switch over (e.g., this may allow the bootloader in the ECU to do the switch and boot into the new version of the application); query the version to confirm the new update is flashed and working and inform the server that the update is complete; if the special agent notices a failure, then transfer the complete new version from BA to the EC; or send the messages to eSync Agent running as Software Component.

The Software Component may perform any one, any combination, or all the following functions: authenticate the server and establish a secure connection; download and verify the packages; decrypt the package; calculate hash and verify; write to flash; or make use of an API to initiate a switch over to Bootloader to finish the update process (e.g., bootloader is expected to return the result of the update performed in the next cycle).

The flash construct may be performed in one of the following ways: (i) A/B two equally capable partitions; or (ii) A, B one back up and one active partition. Further, the Software Component may be able to inform the Bootloader about the availability of the new update in of the Flash constructs such as "new version in B, copy B to A and run from A".

With regard to the A/B flash update scheme, the eSync Software Component may comprise an AUTOSAR application that may interface with the ECU BsW for any one, any combination, or all of: payload transfer; query version; delta reconstruction; or update. Further, the eSync Software Component may be called when the delta package is delivered, with the delta module validating the delta package received and starting the reconstruction of the new version based on the current reference image in the active memory. After the reconstruction, the SHA may be calculated again and if successful, the bootloader may be called to switch the version from the current activity to the new version. the Delta Reconstructor module in the Software Component may require access to the flash to read the reference image and write the new reconstructed image to the backup partition. Further, the package validator may require access to the flash to read the newly reconstructed image.

With regard to the Bootloader, the Bootloader may check a flag in non-volatile memory. Responsive to the Bootloader finding a new version of software, the Bootloader may switch to the new version and clear the flag, so that the new version is booted up subsequently.

With regard to the Erase and Write update scheme, the app may not have much code other than to set the ECU to the extended diagnostic mode. Further, with regard to the eSync Delta reconstructor in Bootloader, in bootloader mode, BA may stream the delta package and the reconstruction may occur as the data is received. If the validation fails, then the complete package may be streamed from BA to the ECU while still in bootloader mode.

With regard to the Bootloader, the bootloader may make use of the delta reconstructor to create the new version as the delta is streamed in. This may allow ECU to get updated with the delta package instead of the full package. Further, if the delta reconstruction is successful and the validation succeeds, then a switch may be performed to the new version. If the delta reconstruction fails, then the BA may restart the package streaming after disabling the delta. However, if the there is a failure to update after retry, then the BA may have a previous copy to reflash to do the rollback and thus revive the ECU.

In serial buses such as CAN/LIN, many ECUs may hang on the same bus and may be addressed individually. However, in such an architecture, updates to each ECU have to be carried out serially as all the devices are on the same serial bus. Given that most of the CAN/LIN ECUs are legacy devices and do not have update agents of their own, in one embodiment, the update agents reside in the nearest domain controllers.

While technically each addressable device can have its own agent in the domain controller, for ease of convenience and management, all the separate agents may all be combined (e.g., grouped together) into a single master agent. The discussion below explains the concept of the Master Agent.

Various implementations of the agent architecture are contemplated. In one implementation, one or more master agents may be situated in various sections of the architecture in order to update one or more groups of electronic devices (where the groups may consist of a single electronic device or multiple electronic devices) in the vehicle architecture. In another implementation, micro-agents may be used, in which micro-agents are distributed and positioned within the architecture to be included in or associated with the electronic device(s) subject to software updates. In still another implementation, a combination of master agent(s) and micro-agent(s) may be used.

Figure 2A:
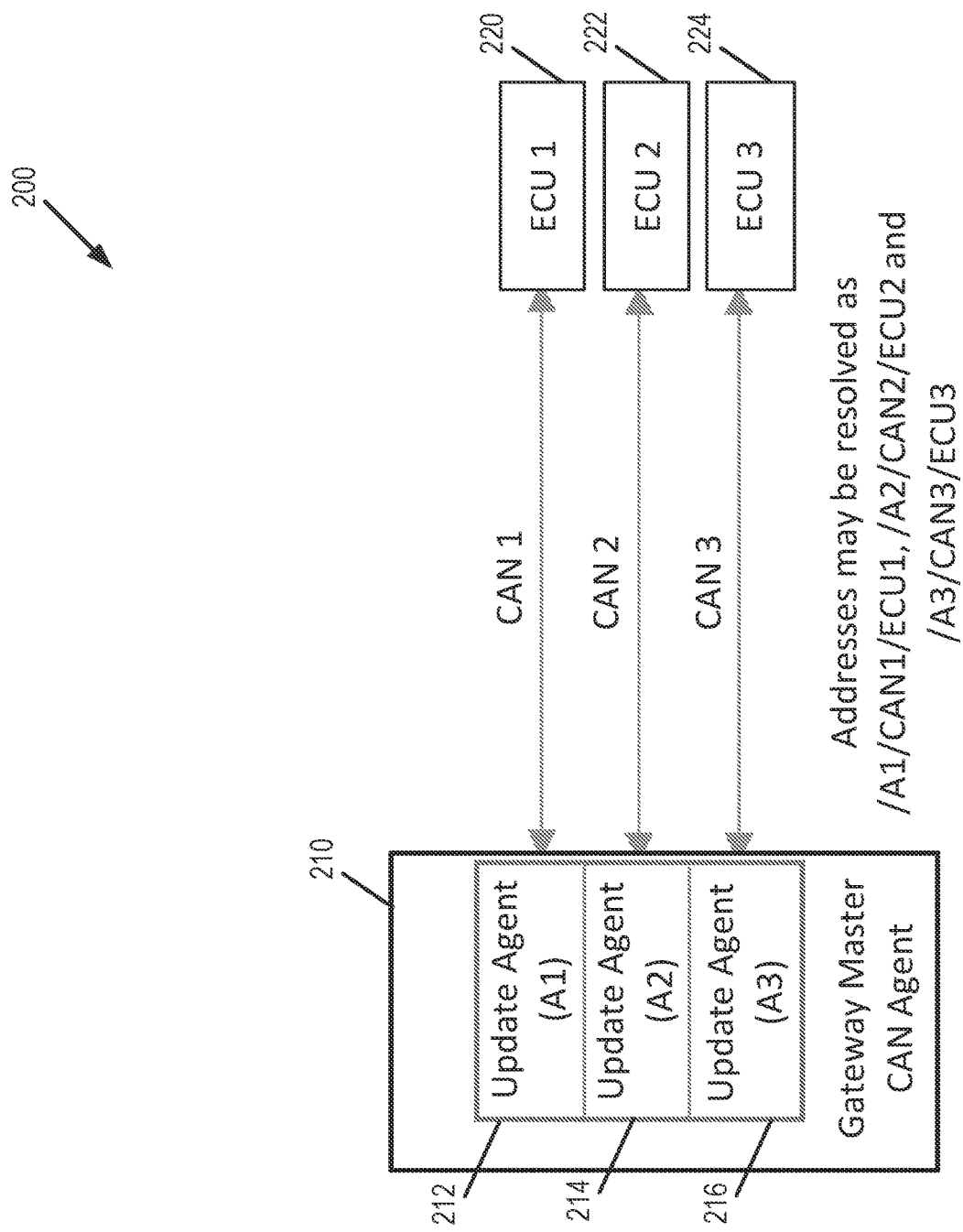
FIG. 2A illustrates ECUs on separate buses (such as separate CAN buses).

FIG. 2A is a block diagram 200 of ECUs (e.g., ECU1 220, ECU2 222, ECU3 224) on separate buses (such as separate CAN buses including CAN1, CAN 2, and CAN 3). In particular, the architecture illustrated in FIG. 2A enables legacy CAN devices to be managed using UDS (Unified Diagnostic Services). Specifically, FIG. 2A illustrates using a cluster in a gateway comprising (or consisting of) three agents, such as Update Agent (A1) 212, Update Agent (A2) 214, and Update Agent (A3) 216. In such an instance, the three agents may be tasked with updating three separate ECUs respectively, with each agent assigned to one ECU on the same or different CAN bus(es). For example, Update Agent (A1) 212 is tasked with update software for ECU 1 220, Update Agent (A2) 214 is tasked with update software for ECU2 222, and Update Agent (A3) 216 is tasked with update software for ECU3 224. Thus, FIG. 2A is an illustration of a CAN bus with three representative ECUs hanging off each of them in different hardware configurations and different agent setups. Each CAN bus may be connected to the domain controller that houses the master agent (such as Gateway Master CAN Agent 210). The addresses may be resolved as hierarchical addresses for the respective device and its associated agent(s). As merely one example, the address for ECU1 220 may be resolved as/A1/CAN1/ECU1.

Figure 2B:
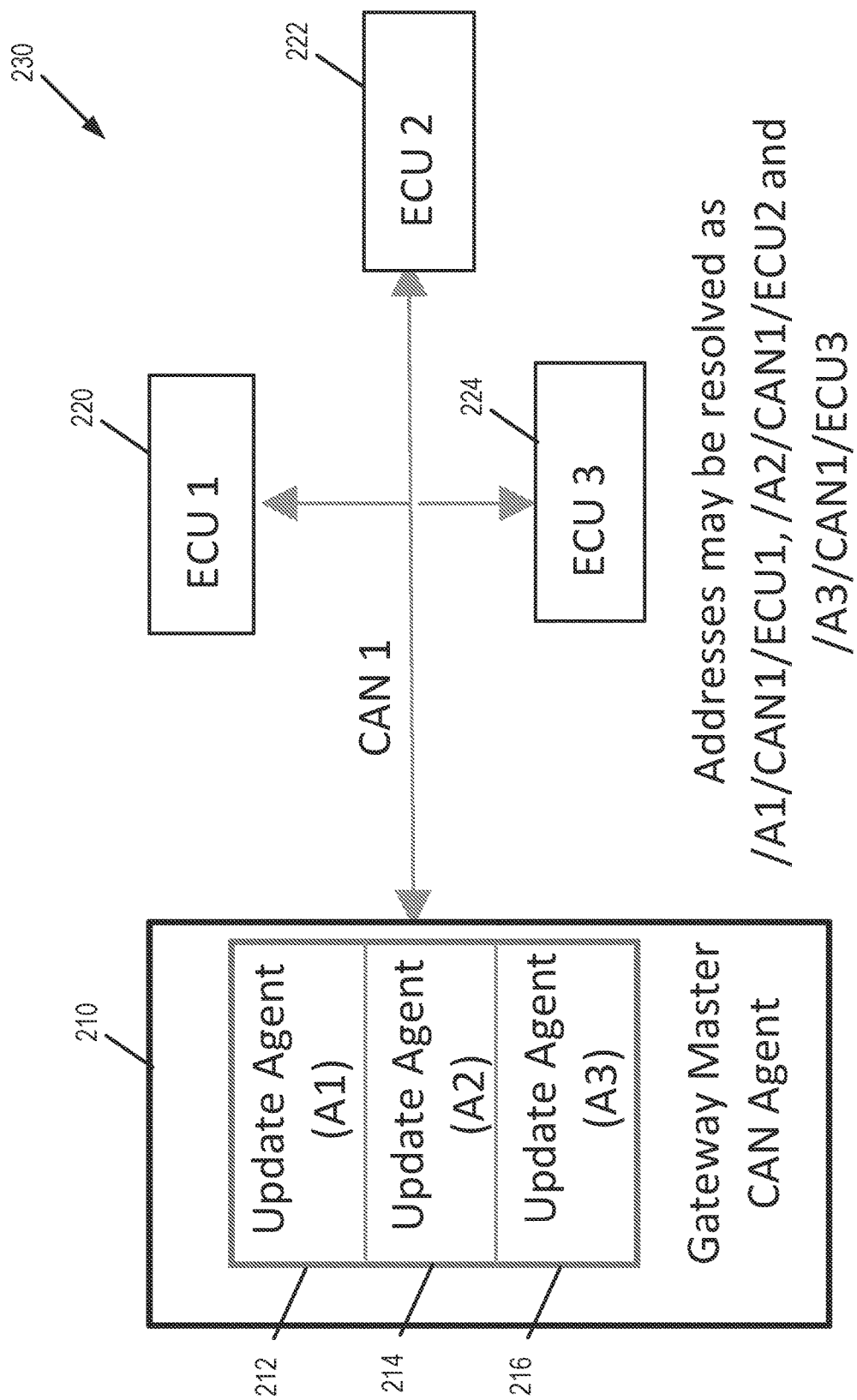
FIG. 2B illustrates ECUs on a single bus (such as a single CAN bus) using multiple update agents incorporated in a single master agent (such as a single gateway master CAN agent).
Figure 2C:
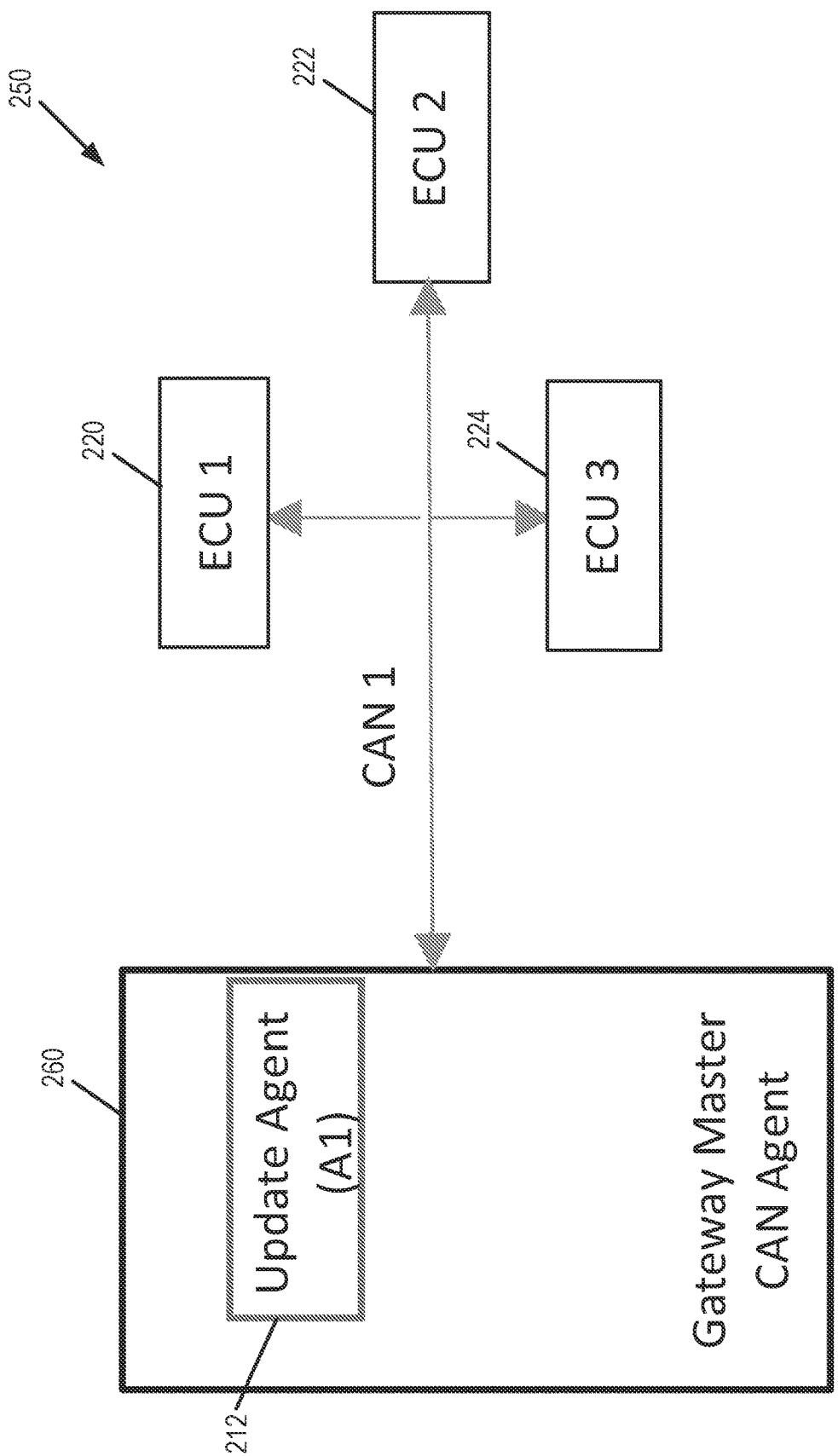
FIG. 2C illustrates ECUs on a single bus (such as a single CAN bus) using a single update agent incorporated in a single master agent (such as a single gateway master CAN agent).

During power on process, the master agent may provide validated addresses of all the ECUs it manages to the eSync message broker. Three representative configurations are provided for illustration in FIGS. 2A-C. Further, each of FIGS. 2A-C illustrate how the addresses are resolved (e.g., the hierarchical addresses for each ECU). In addition, FIGS. 2A-C illustrate one or more update agents may be assigned to a respective electronic device (such as a respective ECU) within the vehicle. As one example, update agents may be assigned in a one-to-one ratio, with one update agent assigned to one ECU. This may be used when the ECUs sit on different CAN buses (e.g., as shown in FIG. 2A) or when the ECUs sit on the same CAN bus (e.g., as shown the block diagram 230 in FIG. 2B). As another example, update agents may be assigned in a one-to-many ratio, with one update agent assigned to a plurality of ECUs (such as at least 2 ECUs, at least 3 ECUs, etc.). This may be used when the ECUs sit on different CAN buses (e.g., as shown in FIG. 2A) or when the ECUs sit on the same CAN bus (e.g., as shown in the block diagram 250 in FIG. 2C). As shown in FIG. 2C, the Gateway Master CAN Agent 260 includes a single Update Agent (A1) 212.

As discussed above, a master agent concept may be applied to controlling legacy devices on a CAN bus. Alternatively, or in addition, the master agent may be applied to newer software organization(s) inside ECUs including one or both of: (1) how to manage multiple Virtual Machines in Multi-core ECUs; and (2) managing portioned processes inside a virtual machine. Further, CAN master agents may be updated from a device external to the vehicle, such as an eSync Server that is sitting on the Internet.

Thus, the division of the architecture into various agents may depend on one or more factors, including any one or both of: the architecture of the system (e.g., the one or more CAN buses); or the types of ECUs (a first type of ECU configured to perform a first type of function, such as braking, may be associated with a first update agent; a second type of ECU configured to perform a second type of function, such as infotainment, may be associated with a second update agent; etc.). For example, a specific agent may be assigned to a set of ECUs that have a common software update. Alternatively, or in addition, agents may be assigned depending on the architecture. For example, a first CAN bus may include a first set of ECUs subject to a first common software update (with a first update agent assigned to the first set of ECUs to perform the first common software update on the first CAN bus) and a second set of ECUs subject to a second common software update (with a second update agent assigned to the second set of ECUs to perform the second common software update on the first CAN bus), and a second CAN bus may include a third set of ECUs subject to the first common software update (with a third update agent assigned to the third set of ECUs to perform the first common software update on the second CAN bus) and a fourth set of ECUs subject to the second common software update (with a fourth update agent assigned to the fourth set of ECUs to perform the second common software update on the second CAN bus). In this way, the agent architecture may be flexibly tailored to various architectures and various types of ECUs.

Figure 3:
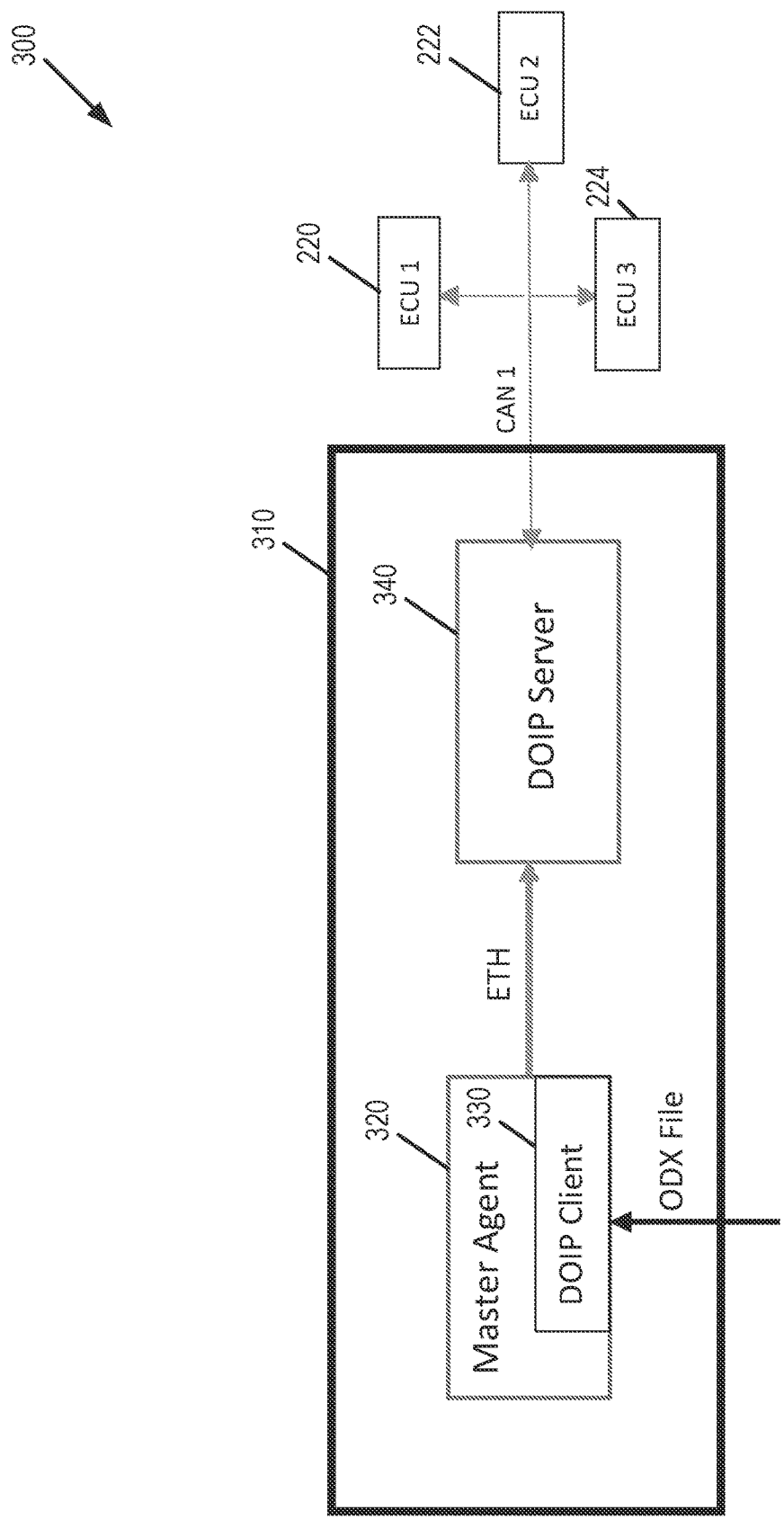
FIG. 3 illustrates a block diagram in which the master agent concept may be applied to Diagnostics over IP (DoIP) Update Agents in the eSync System (e.g., logical association).

FIG. 3 illustrates a block diagram 300 in which the master agent concept may be applied to Diagnostics over IP (DoIP) Update Agents in the eSync System (e.g., logical association). Specifically, if the updates to the ECU, such as ECU1 220, ECU2, 222, and/or ECU3 224, are to be performed using a DoIP (e.g., using Ethernet Connectivity and with a DoIP server), then a DoIP client 330 may be incorporated into the eSync Update Agent (such as Master Agent 320), such as illustrated in FIG. 3.

The diagram in FIG. 3 illustrates logically associated blocks and may not necessarily reside in the same SW block (e.g., the agent may reside in a gateway and DoIP server 340 may reside in a domain controller, such as Domain Controller 310), (connected thru Ethernet)). In another configuration, both the agents (such as Master Agent 320) and the DoIP server 340 may reside in the same electronic device (e.g., within a domain controller). The domain controller may then update the ECUs on the CAN. Further, agents for a device may reside in any referenceable connected node in the system.

In another instance, if the updates are available in an ODX file, then the agent (such as Master Agent 320 illustrated in FIG. 3) may parse the ODX file to extract relevant details related to the update (e.g., any one, any combination, or all of: ROM code; address location; or security details). The agent may then provide the extracted relevant details to the DoIP server 340 through the DoIP Client 330. In turn, the DoIP Client 330 may update the ECUs (such as ECU1 220, ECU2 222 and ECU3 224 illustrated in FIG. 3). The three representative configurations used for the CAN updates, illustrated in FIGS. 2A-C, may also serve to illustrate how DoIP server 340 may update the ECUs.

Further, as discussed above, the master agent's architecture may be extended to multiple virtual machines or separated kernel configurations in an ECU. In particular, ECUs have advanced in computational power (e.g., with multi-cores), memory and I/O resources over the last decade. In this regard, the ECUs govern complex functions in vehicles today, such as the infotainment unit, ADAS, Adaptive AUTomotive Open System Architecture (AUTOSAR), etc., These ECUs may be managed through one or more operating systems, such as Linux/QNX/Integrity mounted as Virtual Machines in their own memory space. Illustrative examples of VMs in a multi-core ECU in two different configurations are shown in FIGS. 4 and 5.

Each VM or a separate kernel may be considered a network connected end point. In specific cases for the update use case, a network connected end point may even be a reference to a file folder or partition or volume or a single file. The addresses for each end point may be resolved as follows:

A separated kernel may be discovered through some network address or connection. In practice, the kernels may share the unified physical memory space. In particular, in one implementation, real-time operating system (RTOS) separated kernel(s) 450 may be executed on hardware 460, such as on a multi-core system on a chip (SOC), with different operating systems running on different cores. A separation kernel is a type of security kernel used to simulate a distributed environment. Further, the task of the separation kernel is to create an environment which is indistinguishable from that provided by a physically distributed system (e.g., it appears as if each regime is a separate, isolated machine and that information can only flow from one machine to another along known external communication lines). Thus, in one implementation, for the separation kernel, there may be no channels for information flow between regimes other than those explicitly provided.

Figure 4:
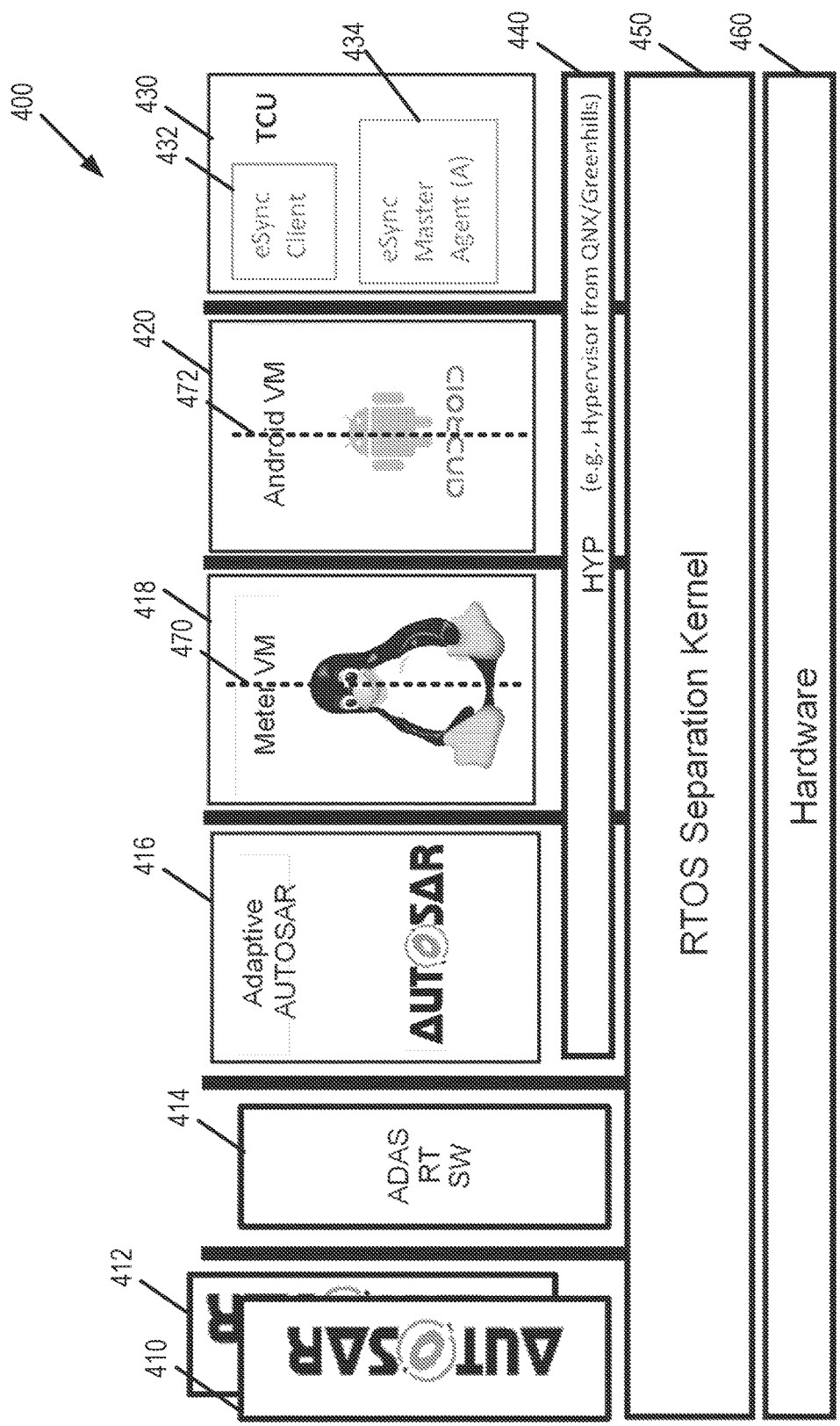
FIG. 4 illustrates a block diagram of a single master update agent in multi-core ECUs using VMs, with dotted lines representing physical partitions.
Figure 5:
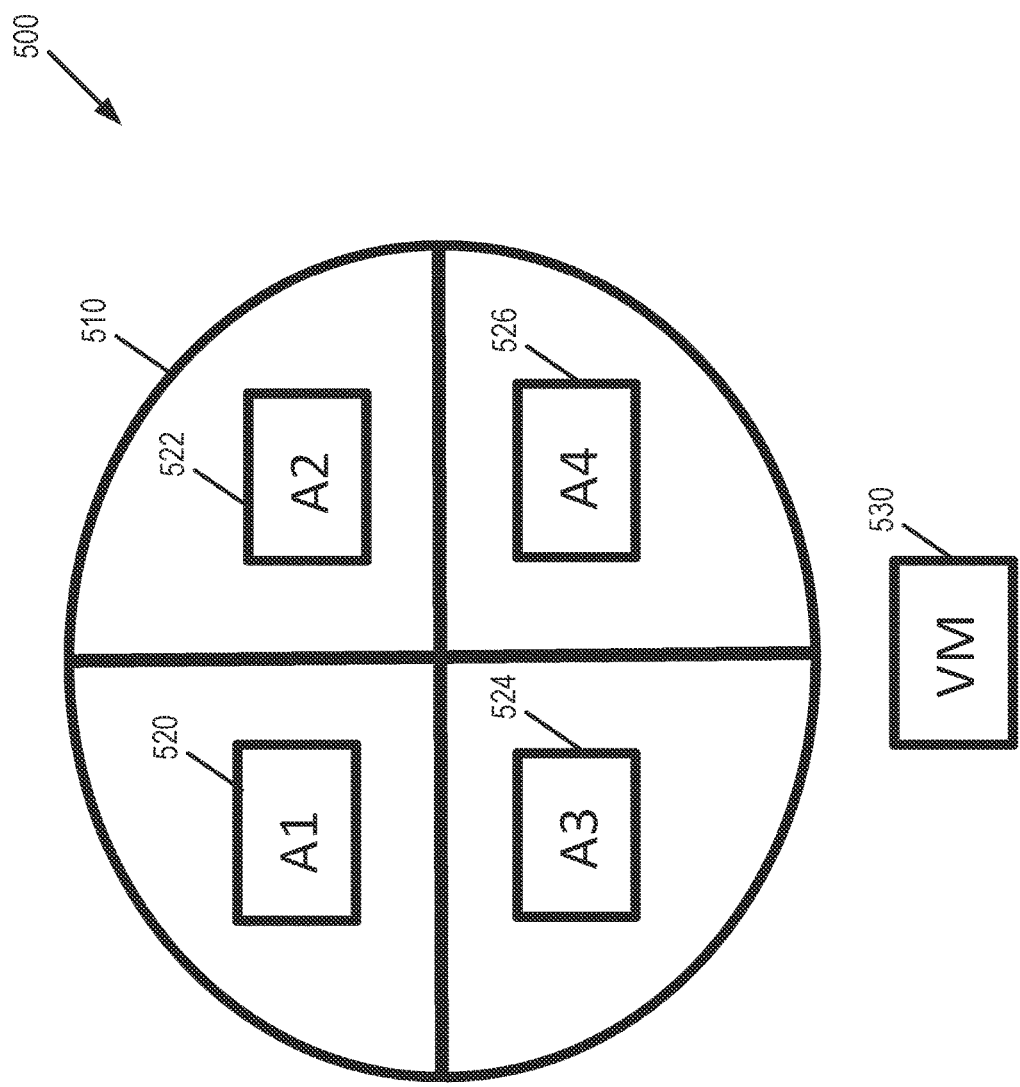
FIG. 5 illustrates a block diagram of a single agent in multi-core ECUs using a single VM with multiple portioned processes.

FIG. 4 comprises a configuration 400 of a single master update agent in multi-core ECUs using virtual machines, with dotted lines 470, 472 representing physical partitions.

As shown, telematic control unit (TCU) 430 includes eSync Master Agent (A) 434 and eSync client 432. Further, within the configuration 400 illustrated in FIG. 4, various addresses may be used to communicate, via a hypervisor 440, with the different kernels, such as /A/TCU (to communicate with TCU 430), /A/Android (to communicate with the Android virtual machine 420), /A (Meter Linux) (to communicate with Meter Virtual Machine (VM) 418), /A/Adaptive-Autosar (to communicate with the Adaptive AUTOSAR 416), /A/ADAS (to communicate with ADAS RT software 414), /A/AUTOSAR (to communicate with the classic AUTOSAR, which may be manifested in one or more instantiations 410, 412).

In particular, hypervisor 440, which may likewise be termed a virtual machine monitor, VMM, virtualizer, may comprise computer software, firmware and/or hardware that creates and runs virtual machines. An electronic device on which a hypervisor runs one or more virtual machines may comprise a host machine, and each virtual machine may comprise a guest machine. Hypervisor 440 may present the guest operating systems with a virtual operating platform and may manage the execution of the guest operating systems. Multiple instances of a variety of operating systems may share the virtualized hardware resources.

In one or some embodiments, updates of partitioned processes may be performed within a virtual machine (VM) or other similar instance. Specifically, a single VM 530 may comprise one or more sectioned independent processes 510 that have been given their own memory space for program and data and also bounded CPU usage. This may be particularly pertinent to contemplated vehicle ADAS platforms that may comprise several independent and isolated functional blocks in a single VM. Each block in its own right may be thoroughly tested and verified each time with other components whenever there is a change or update to the software, in order to confirm whether the update complies with governmental regulations. This testing/verification results in a lot of cost, time, and resources for all involved and even program delays for OEMs. Alternatively, container-based deliveries into one or more VMs or multi-core machines may be used.

By way of example, the processes 510 may include A1 520, A2 522, A3 524, A4 526, and may be part of the ADAS system, which may undergo extensive qualification before being deployed. The agent may update any one, any combination, or all of processes A1-A4 520, 522, 524, 526.

Figure 6:
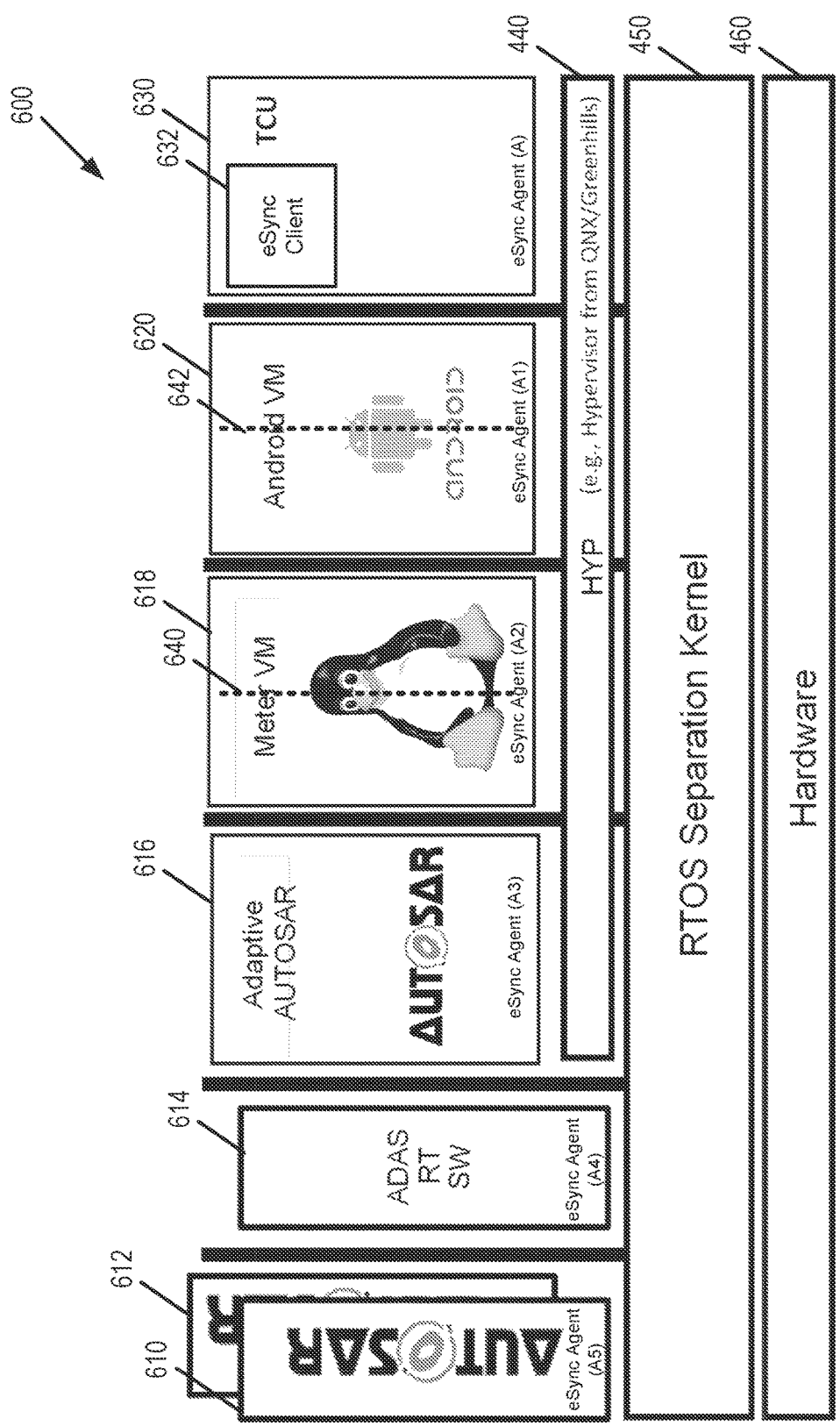
FIG. 6 illustrates a block diagram of distributed agents in multi-core ECUs using multiple VMs and Kernels, with dotted lines indicating partitions.

In one or some embodiments, distributed agents may be used. In particular, if a distributed agent concept is used (e.g., no single agents but multiple agents), then the same configuration 500 of FIG. 5 may have agents as illustrated in FIG. 6. In particular, FIG. 6 illustrates a configuration 600 of distributed agents (eSync Agent A, eSync Agent A1, eSync Agent A2, eSync Agent A3, eSync Agent A4, eSync Agent A5) using multiple virtual machines (VMs) and kernels, with dotted lines 640, 642 indicating partitions. As shown in the configuration 600 in FIG. 6. the eSync Client 532 in the TCU 630 will see the following resolved agent addresses: /A (TCU), /A1 (Android), /A2 (Meter Linux), /A3 (Classic Autosar), /A4 (Adaptive Autosar) and /A5 (RT ADAS).

In one implementation, an eSync bus protocol may use a broker that may act as an intermediary between electronic devices in the environment, such as the intermediary to route messages between the first and second electronic devices in the vehicle (e.g., between an eSync client and an agent, such as a master agent). This is illustrated in the block diagram 800 in FIG. 8 includes the eSync Client, which includes a download manager configured to communicate with a server external to the vehicle in order to download the software update (such as a delta update as disclosed in US Patent Application Publication No. 2019-0265965 A1, incorporated by reference herein in its entirety) and a controller configured to communicate with the download manager and the message broker (also known as a broker). The broker may comprise a standalone device or may comprise a device instantiated within another device. In this regard, the broker may be used interchangeably in any of these configurations. The broker device, such as disclosed in US Patent Application Publication No. 2019-0268420 A1, incorporated by reference herein in its entirety) may be configured to act as an intermediary between the eSync client and the agent (such as the master agent as illustrated in FIG. 9).

In one implementation, the broker may be configured to discover any one, any combination, or all of: addresses of the various devices (e.g., ECUs); capability of the various devices (e.g., whether a specific ECU may have sufficient memory and/or processing power to perform the build of the image of the software update); or architecture in the vehicle (e.g., the different CAN buses and the ECUs connected to the different CAN buses). The broker may also receive the software update from the eSync client. Thus, in one implementation, the broker may communicate with the agent, such as the master agent, in order to transmit any one, any combination or all of: addresses of the electronic devices; capabilities of the electronic device; architecture in the vehicle; or the software update (such as the delta update, which may be used to build the software update). In turn, the agent, such as the master agent, may be configured to transmit the software updates as disclosed herein. As one example, the broker may send all of the addresses, the capabilities, the architecture, and the software update (unbuilt) to the master agent. Alternatively, the broker may send the addresses, the architecture and the software update (unbuilt) to the master agent, with the master agent communicating (using the addresses sent from the broker) with the electronic devices to poll the electronic devices' capabilities in order to determine whether the agent performs the build of the software update or whether the electronic devices perform the build.

Figure 7:
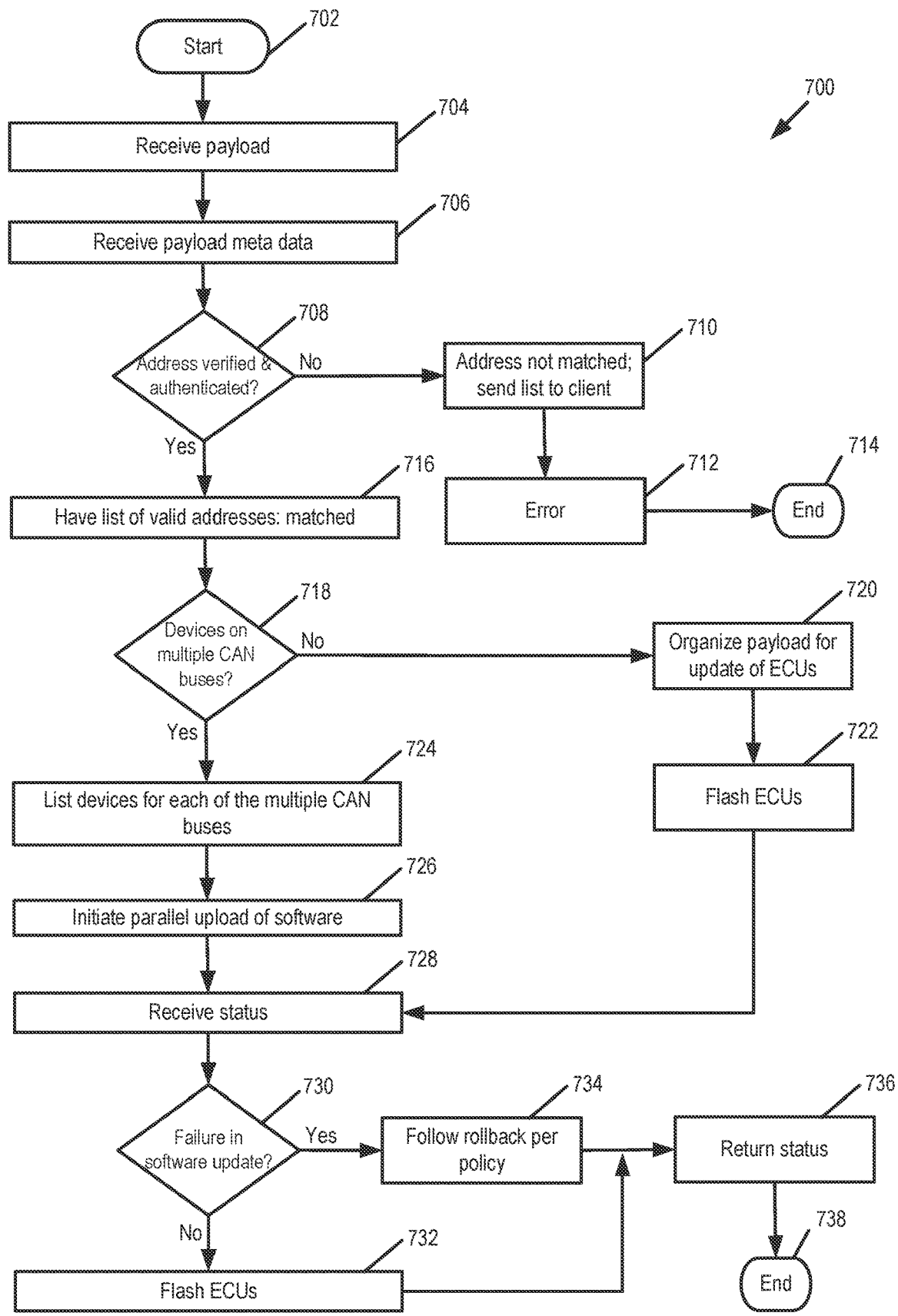
FIG. 7 is an example flow diagram for performing a software update.

An example flow diagram 700 for performing the software update is illustrated in FIG. 7. After starting at 702, the agent receives the payload (for performing the software update, such as the delta) at 704, and may receive payload meta data at 706. The agent, such as the master agent, may examine the meta data and the payload in order to determine one or more aspects of the software updates, such as any one, any combination, or all of: how many updates there are; the types of devices to be updated; or the timing of the updates.

At 708, the agent may determine whether the address that sent the update is verified and authenticated. As discussed above, the eSync client may communicate with an external server in order to obtain the software update (such as the delta). The external server that transmitted the software update may be verified by one or more devices, such as the eSync client and/or the agent. For example, the external server may be verified by both the eSync client and the agent for additional security and verification. In the event that the address of the external server is not verified ("No" at 708), at 710, the address is determined not to be matched to a list of addresses of approved senders, with the list being accessible or internal to the agent. Further, at 712, the agent may send an indication of an error, such as to one or both of the broker or the eSync client, and proceed to end at 714.

If the address is verified and authenticated, at 716, the list of valid addresses may be indicated as matched. Further, at 718, it is determined whether devices are on multiple CAN buses. As discussed above, an agent, such as a master CAN agent, may determine the architecture of the system, such as illustrated in FIGS. 2A-C. In particular, the agent may be apprised of the architecture of the various buses (e.g., the structure of the CAN bus(es) and may resolve the addresses in order to communicate with the different electronic devices (e.g., the different ECUs).

Responsive to determining that there are not devices on multiple CAN buses (meaning that the ECUs are serially connected to a single CAN bus), at 720, the agent may organize the payload for update of the ECUs in a serial fashion. As one example, the agent may send the software update to a first ECU of the ECUs (built in the instance where the ECU is incapable of building the update; or unbuilt in the instance where the ECU is capable of building the update), and wait for confirmation of receipt. Responsive to confirmation, the agent may send the software update to a second ECU of the ECUs, repeatedly doing so until all of the ECUs receive the software update. At 722, the ECUs may store the update (such as flashing the update). Alternatively, if devices are on different CAN buses, at 724, a list of the devices may be generated that are on the different CAN buses, and at 726, a parallel upload of the software update is initiated.

In one implementation, a first set of ECUs may be serially configured on a first CAN bus and a second set of ECUs may be serially configured on a second CAN bus. In such an instance, a parallel update may be performed using a first update agent, which may control the dissemination of the software update to the first set of ECUs on the first CAN bus (e.g., scheduling the serial dissemination such as discussed above at 720), and a second update agent, which may control the dissemination of the software update to the second set of ECUs on the second CAN bus (again scheduling the serial dissemination such as discussed above at 720). In another implementation, the first set of ECUs may be serially configured on the first CAN bus and a second ECU (or the second set of ECUs) may be configured in parallel on the second CAN bus. In such an instance, a parallel update may be performed using the first update agent, which may control the dissemination of the software update to the first set of ECUs on the first CAN bus (e.g., scheduling the serial dissemination such as discussed above at 720), and the second update agent, which may control the dissemination of the software update in parallel to the second set of ECUs on the second CAN bus. Thus, a parallel dissemination may be performed both on the different CAN buses as well as within a respective CAN bus.

Though not depicted in FIG. 7, the agent, such as the master agent, may determine how to perform the software update (e.g., whether to transmit to the ECUs the built software update or to transmit the unbuilt software update to the ECUs for the ECUs themselves to perform the build of the software update). In particular, the agent may include the intelligence to determine how to perform the update, include the address of the ECUs (which may be obtained from the message broker (discussed above), with the message broker discovering all of the electronic devices in the vehicle architecture, including the ECUs in the vehicle and/or the layout (e.g., which CAN bus the specific ECU is connected to) and the addresses of the different devices in the system. Further, the agent may learn the capability of the respective device (such as the respective ECU) to perform the update.

As one example, the respective device may have the capacity to build the image of the software update. In one particular example, a specific ECU may have multiple banks (bank A and bank B), with the multiple banks enabling the specific ECU to use one of the banks to build the image of the software update. In such an instance, the agent may transmit the software update (unbuilt and in encrypted form) in order for the specific ECU to build the image of the software update for installation by the specific ECU. In this particular example, the agent may thus send software updates to the different ECU(s) that can perform the build, without having to hold the bus in order to transmit the built image. As another example, the respective device may not have the capacity (e.g., insufficient memory and/or processing capability) to build the image of the software update. In such an instance, rather than the ECU building the image, the agent may build the image (e.g., retrieve the current software image from the ECU and add the difference in order to generate the built image for the software update) and then transmit to the ECU the built image of the software update for installation by the ECU (e.g., send the built image one-by-one to the different ECUs incapable of performing the build). Thus, separate from the agent(s) transmitting the software updates in serial and/or in parallel, the agent(s) may determine the form of the software update (e.g., built or unbuilt) to the different ECUs. In this way, the hierarchy of the ECUs may be organized.

At 728, the agent may receive the status of the update, such as whether the ECU reports that the update has been performed successfully or not. At 730, the agent determines whether there is a failure in the software update. If so, at 734, a rollback is performed depending on policy. Policy may be determined by the agent in one of several ways. In one way, the policy may be included in the meta data received (such as at 706). Alternatively, the agent may poll the broker or the eSync client for the policy. In one implementation, the policy may indicate that only the ECU that has failed the software update be rolled back to the previous software version. In that instance, the agent may initiate the software update only for the ECUs that reported a failure. In another implementation, the policy may indicate that both ECUs that have reported failure and ECUs that have reported successful update are rolled back. In one example, all of the ECUs that have a common attribute to the ECU that reported the failure (e.g., ECUs on the same CAN bus; ECUs of a same type) are to be rolled back. In such an instance, the agent may initiate the software update only to ECUs that have the common attribute to the ECU that reported the failure.

If no failure is reported, at 732, the ECUs are flashed, at 736, the agent reports the status (e.g., the agent reports to the broker or to the eSync client whether there was a failure or success in the software update), and ends at 738.

Figure 8:
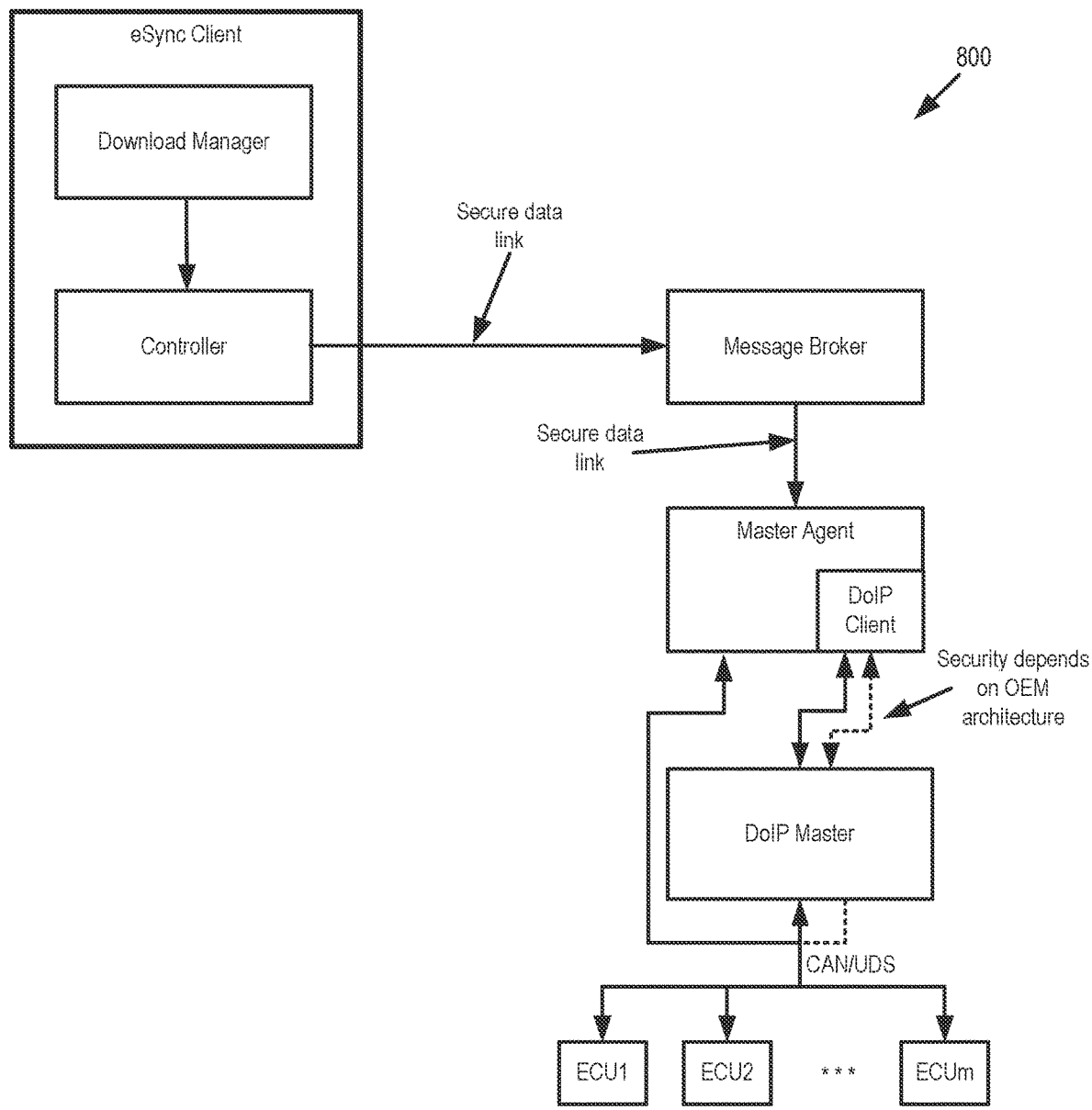
FIG. 8 illustrates a block diagram of an eSync Client, which includes a download manager configured to communicate with a server external to the vehicle in order to download the software update.

Referring back to FIG. 8, the eSync client, including the download functionality and the processing functionality, may include additional functionality. Further, the dotted lines as illustrated in FIG. 8 that the master agent may communicate directly with the ECUs via UDS (instead of via the DoIP master). In particular, there may be certain instances where a master agent, acting in a diagnosis role, may communicate directly with the ECUs. In such an instance, the master agent may communicate directly (master agent to ECUs) or indirectly (via the DoIP master). The OEM may dictate whether the master agent communicates directly or indirectly. Thus, in one implementation, the architecture may flexibly allow the master agent to communicate with the ECUs either directly or indirectly (via the DoIP master). Further, logical representation as illustrated in FIG. 8 may result in the ECUs physically sitting on different CAN buses and/or on the same CAN bus. As discussed above, ECUs sitting on different CAN buses may be updated in parallel. Further, the transport security between the eSync client and the ECUs may be adapted based on OEM dictates. In particular, the OEM may dictate the type of encryption (if any) when transporting the software update from the eSync client via the message broker to the master agent (potentially via the DoIP master) and ultimately to the ECUs. In one example, the OEM may have already encrypted the software update. In that regard, a separate encryption may not be necessary. In another example, the OEM may not have encrypted the software update. In that regard, the OEM may dictate encryption/decryption to be performed by any one of the eSync client, message broker, master agent, or DoIP master. Specifically, various types of security, such as at the data link level and/or at the transport security level, may be dictated by the OEM FIG. 9 illustrates a general computer system 900, programmable to be a specific computer system 900, which can represent any server, electronic device or electronic component disclosed herein, such as any server, any vehicle client, any ECU, any gateway, any head unit, or the like. The computer system 900 may include an ordered listing of a set of instructions 902 that may be executed to cause the computer system 900 to perform any one or more of the methods or computer-based functions disclosed herein. The computer system 900 can operate as a stand-alone device or can be connected, e.g., using the network 945, to other computer systems or peripheral devices.

In a networked deployment, the computer system 900 can operate in the capacity of a server or as a client-user computer in a server-client user network environment, or as a peer computer system in a peer-to-peer (or distributed) network environment. The computer system 900 can also be implemented as or incorporated into various devices, such as a personal computer or a mobile computing device capable of executing a set of instructions 902 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 900 can include a memory 904 on a bus 920 for communicating information. Code operable to cause the computer system to perform any of the acts or operations described herein can be stored in the memory 904. The memory 904 can be a random-access memory, read-only memory, programmable memory, hard disk drive or any other type of volatile or non-volatile memory or storage device.

The computer system 900 can include a processor 908, such as a central processing unit (CPU) and/or a graphics-processing unit (GPU). The processor 908 can include one or more general processors, digital signal processors, application specific integrated circuits, field programmable gate arrays, digital circuits, optical circuits, analog circuits, combinations thereof, or other now known or later-developed devices for analyzing and processing data. The processor 908 can implement the set of instructions 902 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 900 can also include a disk or optical drive unit 915. The disk drive unit 915 can include a computer-readable medium 940 in which one or more sets of instructions 902, e.g., software, can be embedded. Further, the instructions 902 can perform one or more of the operations as described herein. The instructions 902 can reside completely, or at least partially, within the memory 904 or within the processor 908 during execution by the computer system 900. Accordingly, various databases, such as software repository revisions, can be stored in the memory 904 or the disk unit 915.

The memory 904 and the processor 908 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 900 can include an input device 925, such as a keyboard or mouse, configured for a user to interact with any of the components of system 900. It can further include a display 970, such as a liquid crystal display (LCD), a cathode ray tube (CRT), or any other display suitable for conveying information. The display 970 can act as an interface for the user to see the functioning of the processor 908, or specifically as an interface with the software stored in the memory 904 or the drive unit 915.

The computer system 900 can include a communication interface 936 that enables communications via the communications network 945. The network 945 can include wired networks, wireless networks, or combinations thereof. The communication interface 936 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including those illustrated herein including FIGS. 1-6, may be implemented using the computer functionality disclosed in FIG. 9. Further, the flow charts, such as FIGS. 7-8 discussed herein, may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images, or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively, or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively, or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter. In this regard, the above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The following example embodiments of the invention are also disclosed:

Embodiment 1. An update agent device configured to communicate with at least one associated electronic device in a vehicle, the update agent device comprising:

at least one memory configured to store one or both of one or more software update condition indications or one or more rollback indications; and at least one processor configured to:

communicate with a client device resident in the vehicle in order to receive a software update, the client device configured to communicate with an external server in order for the client device to obtain the software update; and (i) determine, based on the one or more software update condition indications, whether to perform the software update; and responsive to determining to perform the software update, perform the software update of the at least one associated electronic device;

or (ii) responsive to determining that there is a failure in performing a software update of another electronic device in the vehicle:

determine, based on the one or more rollback indications, whether to perform a rollback of software in the at least one associated electronic device; and responsive to determining to perform the rollback of the software in the at least one associated electronic device, perform the rollback of the software in the at least one associated electronic device.

Embodiment 2. The update agent device of embodiment 1: where the update agent device is resident inside the at least one associated electronic device.

Embodiment 3. The update agent device of embodiments 1 or 2, where the update agent device is positioned external the at least one associated electronic device.

Embodiment 4. The update agent device of embodiments 1-3, wherein performing the software update comprises decryption;
- wherein the at least one associated electronic device does not perform the decryption; and
- wherein the update agent device is configured to perform the decryption in order to generate an unencrypted software update and to transmit the unencrypted software update to the at least one associated electronic device for installation of the unencrypted software update in the at least one associated electronic device.

Embodiment 5. The update agent device of embodiments 1-4, wherein the update agent device is associated with only a single electronic device;
- wherein receipt of the software update is indicative to the update agent device that the software update is for immediate updating of software in the single electronic device;
- wherein the one or more software update condition indications comprises at least one aspect of current operation of the vehicle;
- wherein the processor is further configured to determine the at least one aspect of current operation of the vehicle; and
- wherein the processor is configured to determine, based on the at least one aspect of the current operation of the vehicle, whether to delay performing the software update for the single electronic device.

Embodiment 6. The update agent device of embodiments 1-5, wherein the at least one aspect of the current operation comprises a current speed of the vehicle; and
- wherein, responsive to determining that the current speed of the vehicle is less than a non-zero predetermined speed, the processor is configured to commence performing the software update.

Embodiment 7. The update agent device of claim embodiments 1-6, wherein the update agent device is associated with only a single electronic device;
- wherein receipt of the software update is indicative to the update agent device that the software update is for immediate updating of software in the single electronic device;
- wherein the one or more software update condition indications comprises at least one aspect of the software associated with the single electronic device;
- wherein the processor is further configured to determine the at least one aspect of the software associated with the single electronic device; and
- wherein the processor is configured to determine, based on the at least one aspect of the software associated with the single electronic device, whether to delay performing the software update for the single electronic device.

Embodiment 8. The update agent device of embodiments 1-7, wherein the at least one aspect of the software associated with the single electronic device comprises a time period since the software associated with the single electronic device was last updated; and
- wherein, responsive to determining that the time period since the software associated with the single electronic device was last updated is less than a predetermined time period, the processor is configured to delay performing the software update for the single electronic device.

Embodiment 9. The update agent device of embodiments 1-8, wherein receipt of the software update is indicative to the update agent device that the software update is for immediate updating of software in the at least one associated electronic device; and
- wherein the processor is configured to:
  - (i) determine, based on the one or more software update condition indications, whether to perform the software update; and responsive to determining to perform the software update, perform the software update of the at least one associated electronic device; and
  - (ii) responsive to determining there is a failure in performing a software update of another electronic device in the vehicle:
    - determine, based on the one or more rollback indications, whether to perform a rollback of software in the at least one associated electronic device; and responsive to determining to perform the rollback of the software in the at least one associated electronic device, perform the rollback of the software in the at least one associated electronic device.

Embodiment 10. The update agent device of embodiments 1-9, wherein the update agent device comprises a master update agent device configured to control rollback of one or more follower update agent devices; and
- wherein responsive to the master update agent device determining that there is the failure in the software update associated with one or both of the electronic device associated with the master update agent device or the one or more electronic devices associated with the one or more follower update agent devices, the processor is configured, based on a policy resident in the master update agent device, to determine whether to instruct the one or more follower update agent devices to rollback the software.

Embodiment 11. The update agent device of embodiments 1-10, wherein responsive to the master update agent device determining that there is the failure in the software update associated with one or both of the electronic device associated with the master update agent device or the one or more electronic devices associated with the one or more follower update agent devices, the processor is configured to instruct all of the one or more follower update agent devices to rollback the software in order to perform a synchronized rollback of the software.

Embodiment 12. The update agent device of embodiments 1-10, wherein responsive to the master update agent device determining that there is the failure in the software update associated with one or both of the electronic device associated with the master update agent device or the one or more electronic devices associated with the one or more follower update agents, the processor is configured to instruct only the one or more follower update agent devices to rollback the software if their associated electronic device has suffered a failure.

Embodiment 13. The update agent device of embodiments 1-12, wherein responsive to the master update agent device determining that there is the failure in the software update associated with one or both of the electronic device associated with the master update agent device or the one or more electronic devices associated with the one or more follower update agent devices, the processor is configured to:
   determine a type or class of electronic device subject to the failure in the software update; and
   based on the type or class of electronic device subject to the failure in the software update, instruct one or more of the follower update agent devices to rollback the software.

Embodiment 14. The update agent device of embodiments 1-13, wherein the processor is further configured to:
   perform data gathering on the at least one associated electronic device; and
   transmit, to the client device, data gathered from the data gathering with the at least one associated electronic device.

Embodiment 15. The update agent device of embodiments 1-14, wherein the processor is further configured to analyze the data gathered in order to determine whether to transmit the data gathered to the client device.

Embodiment 16. The update agent device of embodiments 1-15, wherein the processor is configured to analyze the data gathered by determining similarity or dissimilarity with data the update agent device previously transmitted to the client device;
   wherein responsive to determining similarity of the data the update agent device previously transmitted to the client device, the processor is configured not to transmit the data gathered to the client device; and
   wherein responsive to determining dissimilarity of the data the update agent device previously transmitted to the client device, the processor is configured to transmit the data gathered to the client device.

Embodiment 17. The update agent device of embodiments 1-16, wherein responsive to determining similarity of the data the update agent device previously transmitted to the client device, the processor is configured both not to transmit the data gathered to the client device and to discard the data gathered.

Embodiment 18. The update agent device of embodiments 1-17, wherein the processor is further configured to:
   control operation of at least one aspect of the at least one associated electronic device.

Embodiment 19. The update agent device of embodiments 1-18, wherein the processor is further configured to analyze the at least one aspect of the at least one associated electronic device in order to determine whether to control the at least one aspect of the at least one associated electronic device.

Embodiment 20. The update agent device of embodiments 1-19, wherein the processor is configured, based on the policy resident in the update agent device, to determine whether to control the at least one aspect of the at least one associated electronic device.

Embodiment 21. The update agent device of embodiments 1-20, wherein the processor is further configured to:
   receive, from the client device, a programming indication in order to program the update agent device to activate performing at least one of the software updating, the data gathering, or device controlling;
   responsive to receiving the programming indication, program the update agent device for the at least one of a software updating, the data gathering, or the device controlling;
   communicate with the client device resident in the vehicle in order to perform at least one of: (i) receiving the software update for the at least one associated electronic device; (ii) transmitting to the client device data gathered from the data gathering with the at least one associated electronic device; or (iii) receiving one or more control parameters in order for the update agent device to control the at least one associated electronic device;
   responsive to programming for the software updating and responsive to receiving the software update from the client device:
      determine, based on one or more software update condition indications, whether to perform the software update; and
      responsive to determining to perform the software update, perform the software update of the at least one associated electronic device;
   responsive to programming for the data gathering:
      determine, based on one or more data gathering condition indications, whether to perform the data gathering;
      responsive to determining to perform the data gathering, perform the data gathering in order to obtain data from the at least one associated electronic device; and
      transmit the data from the data gathering to the client device;
   responsive to programming for the device controlling:
      determine, based on one or more control indications, whether to perform the device controlling; and
      responsive to determining to perform the device controlling, perform the device controlling in order to control the at least one associated electronic device.

Embodiment 22. The update agent device of embodiments 1-21, wherein the update agent device is configured for sequential activation of performing functions at least two or more of the software updating, the data gathering, or device controlling.

Embodiment 23. The update agent device of embodiments 1-22, wherein the update agent device is configured for sequential activation of performing the functions of each of the software updating, the data gathering, or device controlling.

Embodiment 24. The update agent device of embodiments 1-23, wherein the processor is configured to receive the programming indication in order to program the update agent device to perform the software updating and at least one of the data gathering or the device controlling.

Embodiment 25. The update agent device of embodiments 1-24, wherein the processor is configured to receive the programming indication in order to program the update agent device to perform each of the software updating, the data gathering, and the device controlling.

Embodiment 26. An update agent device configured to communicate with at least one associated electronic device and a client device in a vehicle, the update agent device comprising:
   at least one memory configured to store one or both of one or more software update condition indications or one or more rollback indications; and
   at least one processor configured to:
      receive, from the client device, a programming indication in order to program the update agent device to activate performing at least one of a software updating, data gathering, or device controlling;
      responsive to receiving the programming indication, program the update agent device for the at least one of a software updating, the data gathering, or the device controlling;

communicate with a client device resident in the vehicle in order to perform at least one of: (i) receiving a software update for the at least one associated electronic device, the client device configured to communicate with an external server in order for the client device to obtain the software update for the software updating; (ii) transmitting to the client device data gathered from the data gathering with the at least one associated electronic device; or (iii) receiving one or more control parameters in order for the update agent device to control the at least one associated electronic device;

responsive to programming for the software updating and responsive to receiving the software update from the client device:
  determine, based on one or more software update condition indications, whether to perform the software update; and
  responsive to determining to perform the software update, perform the software update of the at least one associated electronic device;

responsive to programming for the data gathering:
  determine, based on one or more data gathering condition indications, whether to perform the data gathering;
  responsive to determining to perform the data gathering, perform the data gathering in order to obtain data from the at least one associated electronic device; and
  transmit the data from the data gathering to the client device;

responsive to programming for the device controlling:
  determine, based on one or more control indications, whether to perform the device controlling; and
  responsive to determining to perform the device controlling, perform the device controlling in order to control the at least one associated electronic device.

Embodiment 27. The update agent device of embodiment 26: wherein the programming indication received from the client device is in turn received from a server external to the vehicle; and
  wherein the update agent device is configured for sequential activation of performing functions at least two or more of the software updating, the data gathering, or device controlling.

Embodiment 28. The update agent device of embodiments 26-27, wherein the update agent device is configured for sequential activation of performing the functions of each of the software updating, the data gathering, or device controlling.

Embodiment 29. The update agent device of embodiments 26-28, wherein the processor is configured to receive the programming indication in order to program the update agent device to perform the software updating and at least one of the data gathering or the device controlling.

Embodiment 30. The update agent device of embodiments 26-29, wherein the processor is configured to receive the programming indication in order to program the update agent device to perform each of the software updating, the data gathering, and the device controlling.

Embodiment 31. A method for performing the steps recited in embodiments 1-25.

Embodiment 32. A method for performing the steps recited in embodiments 26-30.

We claim:

1. An update agent device configured to communicate with at least one associated electronic device in a vehicle, the update agent device comprising:
  at least one memory configured to store both of one or more software update condition indications and one or more rollback indications; and
  at least one processor configured to:
    communicate with a client device resident in the vehicle in order to receive a software update, wherein the client device is configured to communicate with an external server in order for the client device to obtain the software update; and
    (i) determine, based on the one or more software update condition indications, whether to perform the software update; and responsive to determining to perform the software update, perform the software update of the at least one associated electronic device in the vehicle; and
    (ii) responsive to determining that there is a failure in performing a software update of another electronic device in the vehicle:
      determine, based on the one or more rollback indications, whether to perform a rollback of software in the at least one associated electronic device in the vehicle; and
      responsive to determining to perform the rollback of the software in the at least one associated electronic device in the vehicle, perform the rollback of the software in the at least one associated electronic device in the vehicle;
  wherein the update agent device further comprises a master update agent device configured to control rollback of software in one or more follower update agent devices; and
  wherein responsive to the master update agent device determining that there is a failure in a software update associated with one or both of an electronic device associated with the master update agent device or one or more electronic devices associated with the one or more follower update agent devices, the at least one processor is further configured to, based on a policy resident in or accessible by the master update agent device, determine whether to instruct the one or more follower update agent devices to rollback the software.

2. The update agent device of claim 1, where the update agent device is positioned external to the at least one associated electronic device in the vehicle;
  wherein performing the software update comprises decryption;
  wherein the at least one associated electronic device in the vehicle does not perform the decryption; and
  wherein the update agent device is configured to perform the decryption in order to generate an unencrypted software update and to transmit the unencrypted software update to the at least one associated electronic device in the vehicle for installation of the unencrypted software update in the at least one associated electronic device in the vehicle.

3. The update agent device of claim 1, wherein the update agent device is associated with only a single electronic device;
  wherein receipt of the software update is indicative to the update agent device that the software update is for immediate updating of software in the single electronic device;

wherein the one or more software update condition indications comprise at least one aspect of current operation of the vehicle;

wherein the at least one aspect of the current operation of the vehicle comprises a current speed of the vehicle;

wherein the at least one processor is further configured to determine the at least one aspect of the current operation of the vehicle; and wherein responsive to determining that the current speed of the vehicle is less than a non-zero predetermined speed, the at least one processor is further configured to commence performing the software update.

4. The update agent device of claim 1, wherein the update agent device is associated with only a single electronic device;

wherein receipt of the software update is indicative to the update agent device that the software update is for immediate updating of software in the single electronic device;

wherein the one or more software update condition indications comprise at least one aspect of the software associated with the single electronic device;

wherein the at least one processor is further configured to determine the at least one aspect of the software associated with the single electronic device, the at least one aspect of the software associated with the single electronic device comprises a time period since the software associated with the single electronic device was last updated; and wherein responsive to determining that the time period since the software associated with the single electronic device was last updated is less than a predetermined time period, the at least one processor is further configured to delay performing the software update for the single electronic device.

5. The update agent device of claim 1, wherein receipt of the software update is indicative to the update agent device that the software update is for immediate updating of software in the at least one associated electronic device in the vehicle.

6. The update agent device of claim 1, wherein responsive to the master update agent device determining that there is the failure in the software update associated with only one but not both of the electronic device associated with the master update agent device or the one or more electronic devices associated with the one or more follower update agent devices, the at least one processor is further configured to instruct all of the one or more follower update agent devices to rollback the software in order to perform a synchronized rollback of the software.

7. The update agent device of claim 1, wherein responsive to the master update agent device determining that there is the failure in the software update associated with one or both of the electronic device associated with the master update agent device or the one or more electronic devices associated with the one or more follower update agent devices, the at least one processor is further configured to:

determine a type or class of electronic device subject to the failure in the software update; and based on the type or class of electronic device subject to the failure in the software update, instruct the one or more follower update agent devices to rollback the software.

8. The update agent device of claim 1, wherein the at least one processor is further configured to:

perform data gathering on the at least one associated electronic device in the vehicle; and transmit, to the client device, data gathered from the data gathering on the at least one associated electronic device in the vehicle.

9. The update agent device of claim 8, wherein the at least one processor is further configured to:

analyze the data gathered from the data gathering in order to determine whether to transmit the data gathered from the data gathering to the client device.

10. The update agent device of claim 9, wherein the at least one processor is further configured to analyze the data gathered from the data gathering by determining similarity or dissimilarity with data the update agent device previously transmitted to the client device;

wherein responsive to determining similarity of the data the update agent device previously transmitted to the client device, the at least one processor is further configured not to transmit the data gathered from the data gathering to the client device; and wherein responsive to determining dissimilarity of the data the update agent device previously transmitted to the client device, the at least one processor is further configured to transmit the data gathered from the data gathering to the client device.

11. The update agent device of claim 10, wherein responsive to determining similarity of the data the update agent device previously transmitted to the client device, the at least one processor is further configured to both not transmit the data gathered from the data gathering to the client device and to discard the data gathered from the data gathering.

12. The update agent device of claim 8, wherein the at least one processor is further configured to:

control operation of at least one aspect of the at least one associated electronic device in the vehicle.

13. The update agent device of claim 12, wherein the at least one processor is further configured to analyze the at least one aspect of the at least one associated electronic device in the vehicle in order to determine whether to control the at least one aspect of the at least one associated electronic device in the vehicle; and wherein the at least one processor is further configured to, based on the policy resident in or accessible by the master update agent device, determine whether to control the at least one aspect of the at least one associated electronic device in the vehicle.

14. The update agent device of claim 12, wherein the at least one processor is further configured to:

receive, from the client device, a programming indication in order to program the update agent device to activate performing at least one of software updating, the data gathering, or device controlling;

responsive to receiving the programming indication, program the update agent device for the at least one of the software updating, the data gathering, or the device controlling;

communicate with the client device resident in the vehicle in order to perform at least one of: (i) receiving the software update for the at least one associated electronic device in the vehicle; (ii) transmitting to the client device the data gathered from the data gathering with the at least one associated electronic device in the vehicle; or (iii) receiving one or more control parameters in order for the update agent device to control the at least one associated electronic device in the vehicle;

responsive to programming for the software updating and responsive to receiving the software update from the client device:

determine, based on the one or more software update condition indications, whether to perform the software updating; and responsive to determining to perform the software updating, perform the software updating of the at least one associated electronic device in the vehicle;

responsive to programming for the data gathering:
determine, based on one or more data gathering condition indications, whether to perform the data gathering;
responsive to determining to perform the data gathering, perform the data gathering in order to obtain data from the at least one associated electronic device in the vehicle; and
transmit the data obtained from the data gathering to the client device; and responsive to programming for the device controlling:
determine, based on one or more device control condition indications, whether to perform the device controlling; and
responsive to determining to perform the device controlling, perform the device controlling in order to control the at least one associated electronic device in the vehicle.

15. The update agent device of claim 14, wherein the update agent device is configured to sequentially activate performing functions at least two or more of the software updating, the data gathering, or the device controlling.

16. The update agent device of claim 15, wherein the update agent device is configured to sequentially activate performing the functions of each of the software updating, the data gathering, or the device controlling.

17. The update agent device of claim 15, wherein the at least one processor is further configured to receive the programming indication in order to program the update agent device to perform the software updating and at least one of the data gathering or the device controlling.

18. The update agent device of claim 15, wherein the at least one processor is further configured to receive the programming indication in order to program the update agent device to perform each of the software updating, the data gathering, and the device controlling.

19. The update agent device of claim 1, wherein the master update agent device is configured to receive the policy as data received for performing the software update.

20. An update agent device configured to communicate with at least one associated electronic device and a client device in a vehicle, the update agent device comprising:
at least one memory configured to store both of one or more software update condition indications and one or more rollback indications; and
at least one processor configured to:
receive, from the client device, a programming indication in order to program the update agent device to activate performing at least one of software updating, data gathering, or device controlling;
responsive to receiving the programming indication, program the update agent device for the at least one of the software updating, the data gathering, or the device controlling;
communicate with a client device resident in the vehicle in order to perform at least one of: (i) receiving a software update for the at least one associated electronic device in the vehicle, wherein the client device is configured to communicate with an external server in order for the client device to obtain the software update for the software updating; (ii) transmitting to the client device data gathered from the data gathering with the at least one associated electronic device in the vehicle; or (iii) receiving one or more control parameters in order for the update agent device to control the at least one associated electronic device in the vehicle;

responsive to programming for the software updating and responsive to receiving the software update from the client device:
determine, based on the one or more software update condition indications, whether to perform the software updating; and
responsive to determining to perform the software updating, perform the software updating of the at least one associated electronic device in the vehicle;

responsive to programming for the data gathering:
determine, based on one or more data gathering condition indications, whether to perform the data gathering;
responsive to determining to perform the data gathering, perform the data gathering in order to obtain data from the at least one associated electronic device in the vehicle; and
transmit the data obtained from the data gathering to the client device; and responsive to programming for the device controlling:
determine, based on one or more device control condition indications, whether to perform the device controlling; and
responsive to determining to perform the device controlling, perform the device controlling in order to control the at least one associated electronic device in the vehicle.

21. The update agent device of claim 20, wherein the programming indication received from the client device is in turn received from a server external to the vehicle; and
wherein the update agent device is configured to sequentially activate performing functions at least two or more of the software updating, the data gathering, or the device controlling.

22. The update agent device of claim 21, wherein the update agent device is configured to sequentially activate performing the functions of each of the software updating, the data gathering, or the device controlling.

23. The update agent device of claim 21, wherein the at least one processor is further configured to receive the programming indication in order to program the update agent device to perform the software updating and at least one of the data gathering or the device controlling.

24. The update agent device of claim 21, wherein the at least one processor is further configured to receive the programming indication in order to program the update agent device to perform each of the software updating, the data gathering, and the device controlling.

* * * * *